(12) United States Patent
Inoue et al.

(10) Patent No.: US 11,189,858 B2
(45) Date of Patent: Nov. 30, 2021

(54) ELECTRICITY STORAGE MODULE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Taku Inoue, Kariya (JP); Takayuki Hirose, Kariya (JP); Motoyoshi Okumura, Nagoya (JP); Takuro Kikuchi, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/650,041

(22) PCT Filed: Aug. 21, 2018

(86) PCT No.: PCT/JP2018/030850
§ 371 (c)(1),
(2) Date: Mar. 24, 2020

(87) PCT Pub. No.: WO2019/065000
PCT Pub. Date: Apr. 4, 2019

(65) Prior Publication Data
US 2020/0227772 A1      Jul. 16, 2020

(30) Foreign Application Priority Data

Sep. 26, 2017   (JP) .............................. JP2017-184824

(51) Int. Cl.
*H01M 50/20*        (2021.01)
*H01M 50/30*        (2021.01)
(Continued)

(52) U.S. Cl.
CPC ....... *H01M 10/044* (2013.01); *H01M 50/325* (2021.01)

(58) Field of Classification Search
CPC ... H01M 50/325; H01M 50/20; H01M 10/044
See application file for complete search history.

(56) References Cited

U.S. PATENT DOCUMENTS

| 2005/0260493 A1* | 11/2005 | Frederiksson | ...... H01M 10/282 429/210 |
| 2009/0208820 A1* | 8/2009 | Nishino | .............. H01M 50/342 429/56 |

FOREIGN PATENT DOCUMENTS

JP        2010287451 A      12/2010

OTHER PUBLICATIONS

International Preliminary Report on Patentability with translation of Written Opinion dated Mar. 31, 2020, in International Application No. PCT/JP2018/030850.

* cited by examiner

*Primary Examiner* — Kenneth J Douyette
(74) *Attorney, Agent, or Firm* — Sughrue Mion, PLLC

(57) ABSTRACT

An electricity storage module includes: a laminate including a plurality of bipolar electrodes, each bipolar electrode including an electrode plate, a positive electrode, and a negative electrode; a frame body holding an edge portion of the electrode plate and including an opening that communicates with internal spaces; and a pressure regulating valve connected to the opening. Each internal space is provided between the bipolar electrodes. Each internal space accommodates an electrolytic solution. An exhaust port and a communication space are provided in the pressure regulating valve. The exhaust port is provided for exhausting gas to an external space. The communication space communicates with the exhaust port. The communication space includes a (Continued)

space portion positioned below a lower end of the exhaust port.

4 Claims, 14 Drawing Sheets

(51) Int. Cl.
*H01M 50/325* (2021.01)
*H01M 10/04* (2006.01)

*Fig.7*
(A)
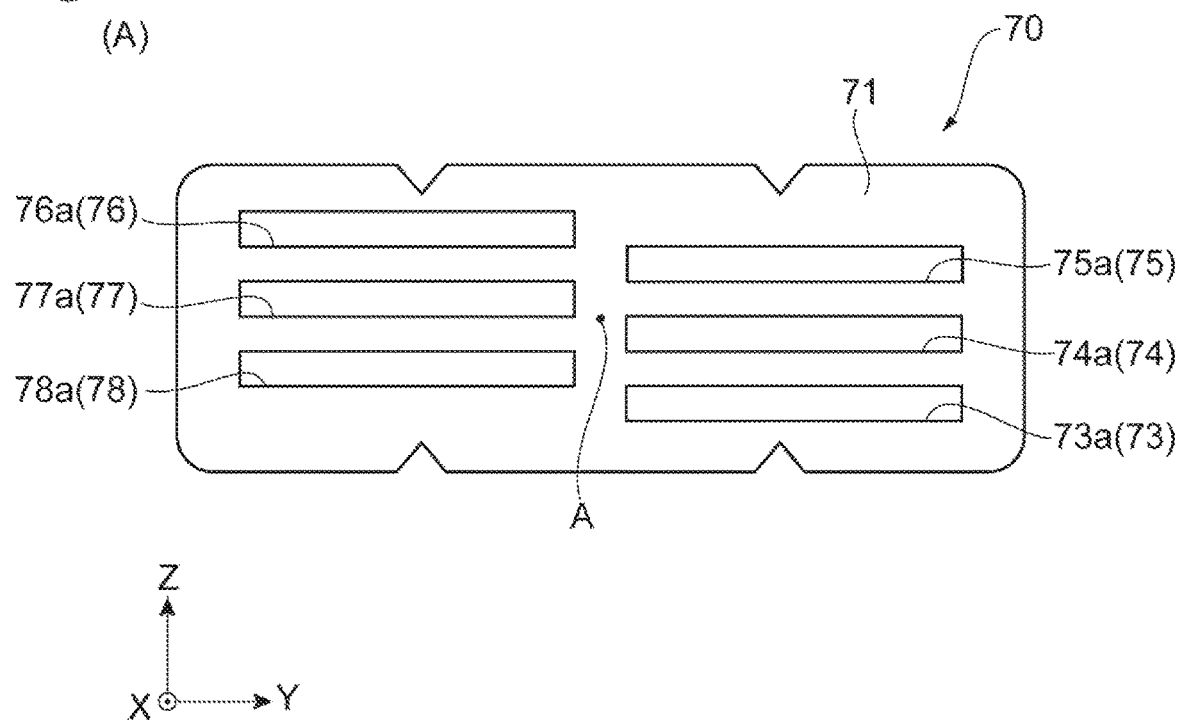
(B)
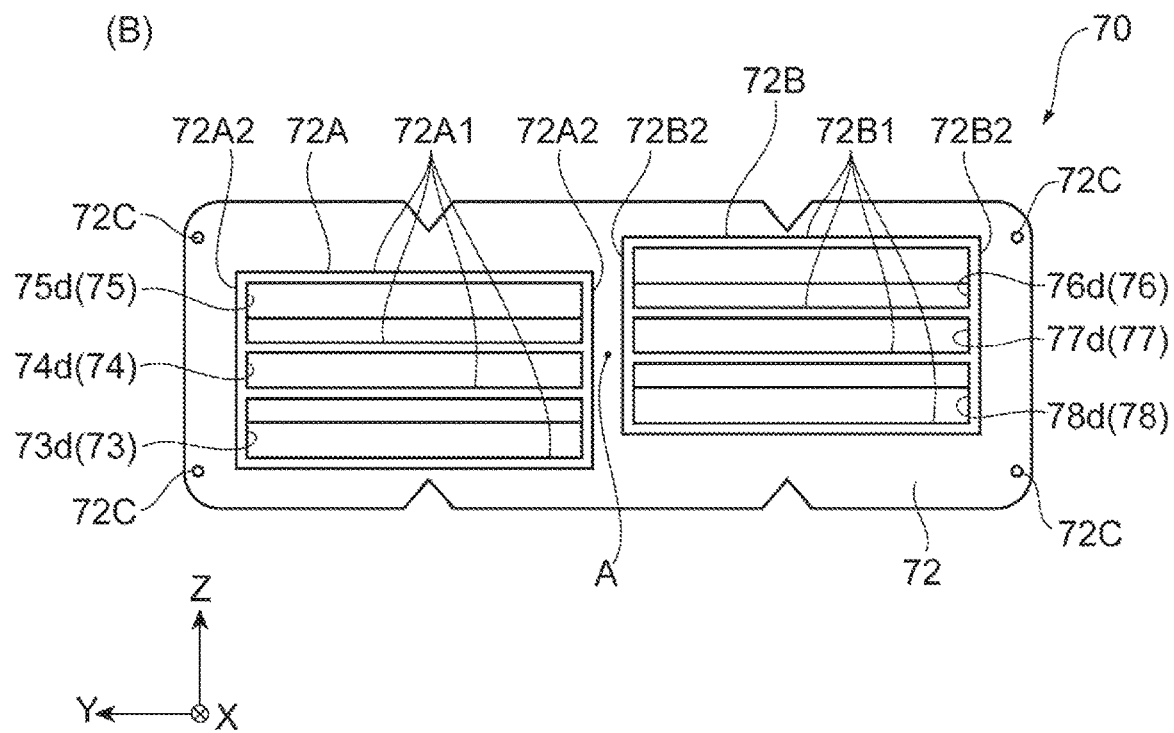

Fig.9
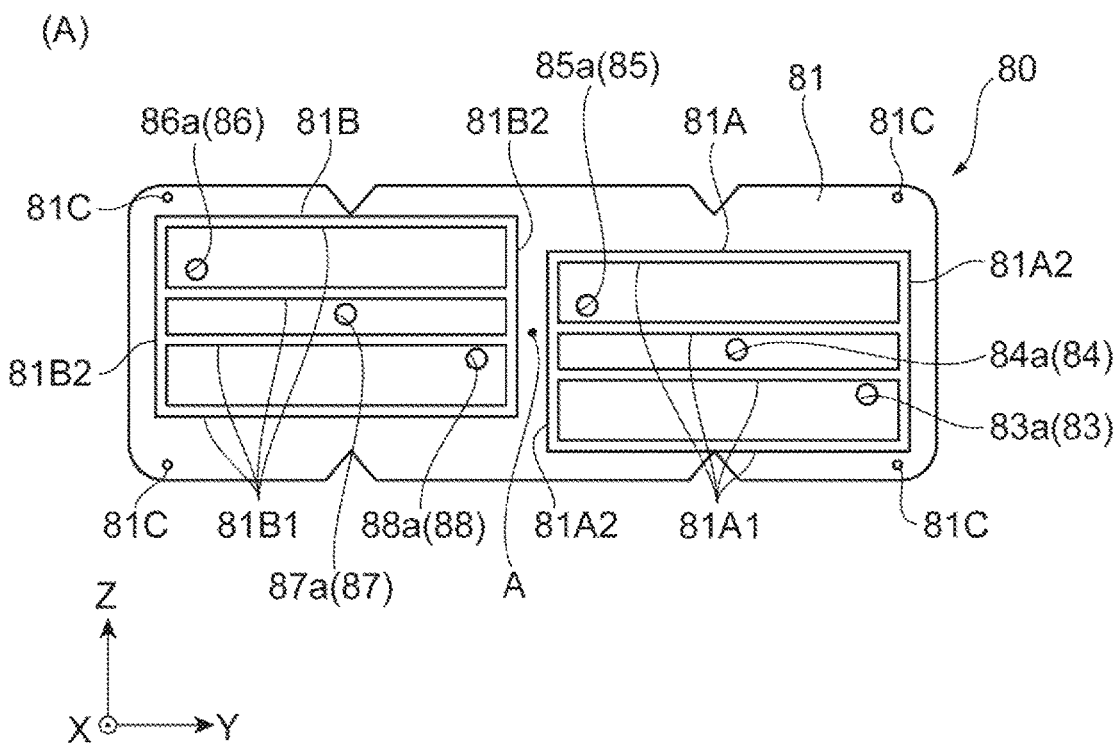
(A)
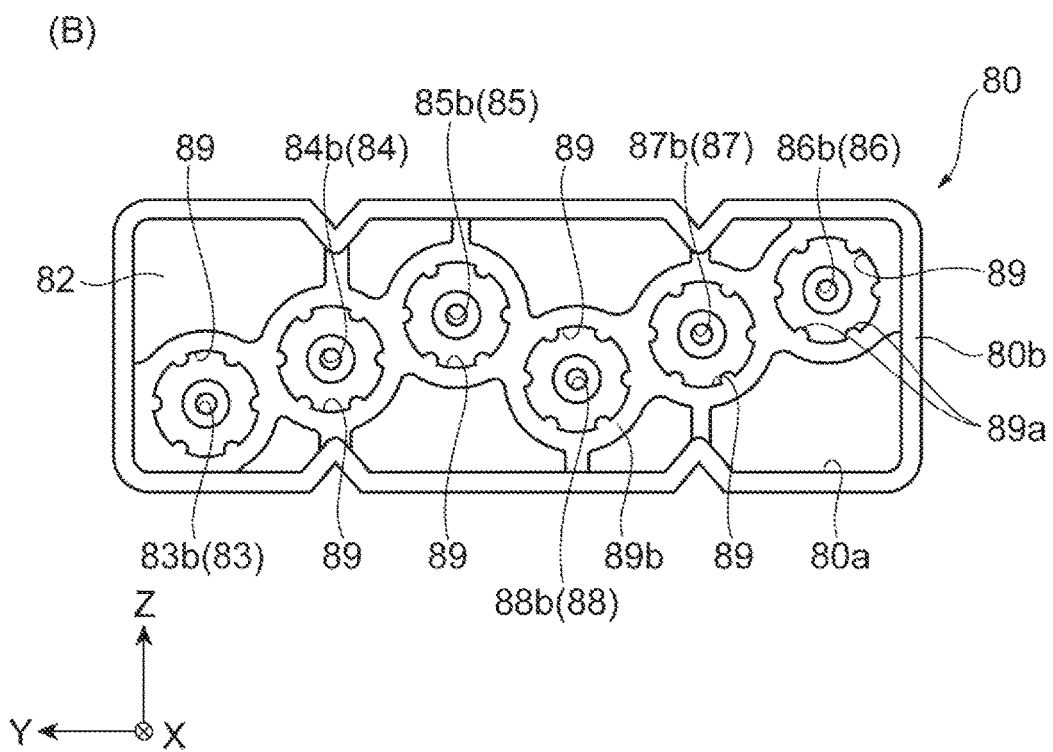
(B)

Fig.12
(A)
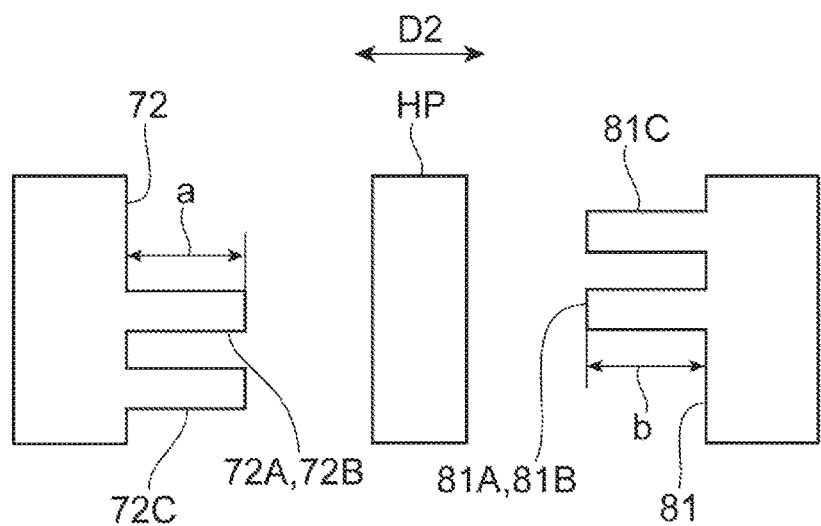
(B)
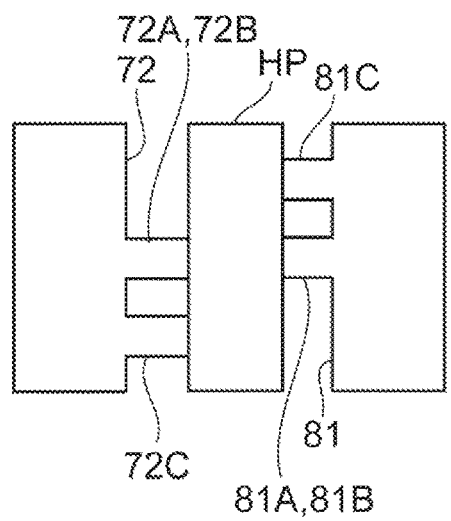
(C)
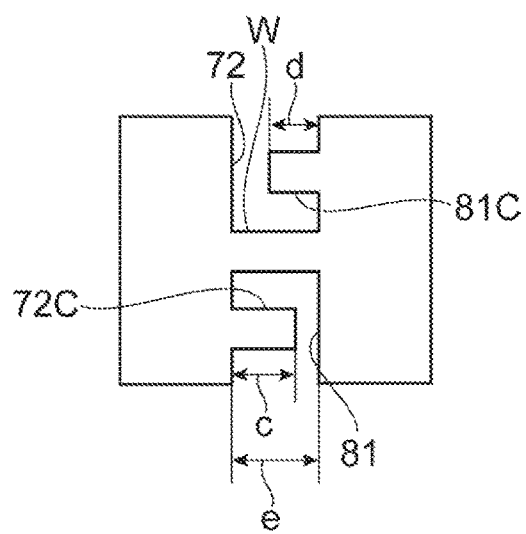

ELECTRICITY STORAGE MODULE

CROSS REFERENCE TO RELATED APPLICATIONS

This application is a National Stage of International Application No. PCT/JP2018/030850, filed Aug. 21, 2018, claiming priority to Japanese Patent Application No. 2017-184824, filed Sep. 26, 2017.

TECHNICAL FIELD

One aspect of the present invention relates to an electricity storage module.

BACKGROUND ART

A bipolar battery (electricity storage module) including a bipolar electrode in which a positive electrode is formed on one surface of a current collector and a negative electrode is formed on the other surface of the current collector is known (refer to Patent Literature 1). In this battery, an electrolytic solution is sealed in an internal space that is partitioned into a separator, a current collector, and a seal member. The bipolar electrodes are laminated through an electrolyte layer including the separator impregnated with an electrolytic solution. In the battery, a tube that penetrates a seal portion is provided. One end of the tube faces the internal space, and the other end of the tube faces an external space of the battery. When a pressure of the internal space increases during use of the battery, this tube functions as a pressure regulating valve.

CITATION LIST

Patent Literature

[Patent Literature 1] Japanese Unexamined Patent Publication No. 2010-287451

SUMMARY OF INVENTION

Technical Problem

However, in the configuration described in Patent Literature 1, when gas in the internal space is exhausted to the external space through the tube, the electrolytic solution may also be exhausted to the external space together with the gas.

An object of one aspect of the present invention is to provide an electricity storage module in which an electrolytic solution can be inhibited from being exhausted to an external space through an exhaust port of a pressure regulating valve.

Solution to Problem

According to one aspect of the present invention, there is provided an electricity storage module including: a laminate including a plurality of bipolar electrodes that are laminated, each of the bipolar electrodes including an electrode plate, a positive electrode provided on a first surface of the electrode plate, and a negative electrode provided on a second surface of the electrode plate; a frame body holding an edge portion of the electrode plate and including an opening that communicates with a plurality of internal spaces provided in the laminate; and a pressure regulating valve connected to the opening, in which each of the internal spaces is provided between the bipolar electrodes adjacent to each other in the laminate, each of the internal spaces accommodates an electrolytic solution, an exhaust port and a communication space are provided in the pressure regulating valve, the exhaust port being provided for exhausting gas to an external space, the gas flowing into the pressure regulating valve through at least one of the internal spaces, the communication space communicating with the exhaust port, and the communication space includes a space portion positioned below a lower end of the exhaust port.

According to the electricity storage module, even when the electrolytic solution of the internal space flows into the pressure regulating valve together with gas, the space portion is present below the lower end of the exhaust port, and thus the electrolytic solution remains in the space portion. Accordingly, the exhaust of the electrolytic solution to the external space through the exhaust port of the pressure regulating valve can be inhibited.

A volume of the space portion may be higher than or equal to a volume of the electrolytic solution accommodated in one of the internal spaces. In this case, even when substantially all the electrolytic solution accommodated in one internal space flows into the pressure regulating valve, substantially all the electrolytic solution can be retained in the space portion positioned below the lower end of the exhaust port.

The lower end of the exhaust port may be positioned above a center of the pressure regulating valve in a vertical direction. In this case, the volume of the space portion positioned below the lower end of the exhaust port can be made to be relatively high.

A plurality of exhaust ports for exhausting the gas to the external space may be provided in the pressure regulating valve, the communication space may communicate with the exhaust ports, and the communication space may include the space portion positioned below a lower end that is positioned on a lowermost side among lower ends of the exhaust ports. In this case, exhaust portions can be dispersed, and the space portion can be shared by the exhaust ports.

Advantageous Effects of Invention

According to one aspect of the present invention, it is possible to provide an electricity storage module in which an electrolytic solution can be inhibited from being exhausted to an external space through an exhaust port of a pressure regulating valve.

BRIEF DESCRIPTION OF DRAWINGS

FIG. 7 is a diagram showing (A) a side surface on the frame opening side and (B) a side surface on the case member side of a base member.

FIG. 9 is a diagram showing (A) a side surface on the base member side and (B) a side surface on the cover member side of the case member.

FIG. 12 is a diagram schematically showing the procedure of a joining step.

DESCRIPTION OF EMBODIMENTS

Figure 1:
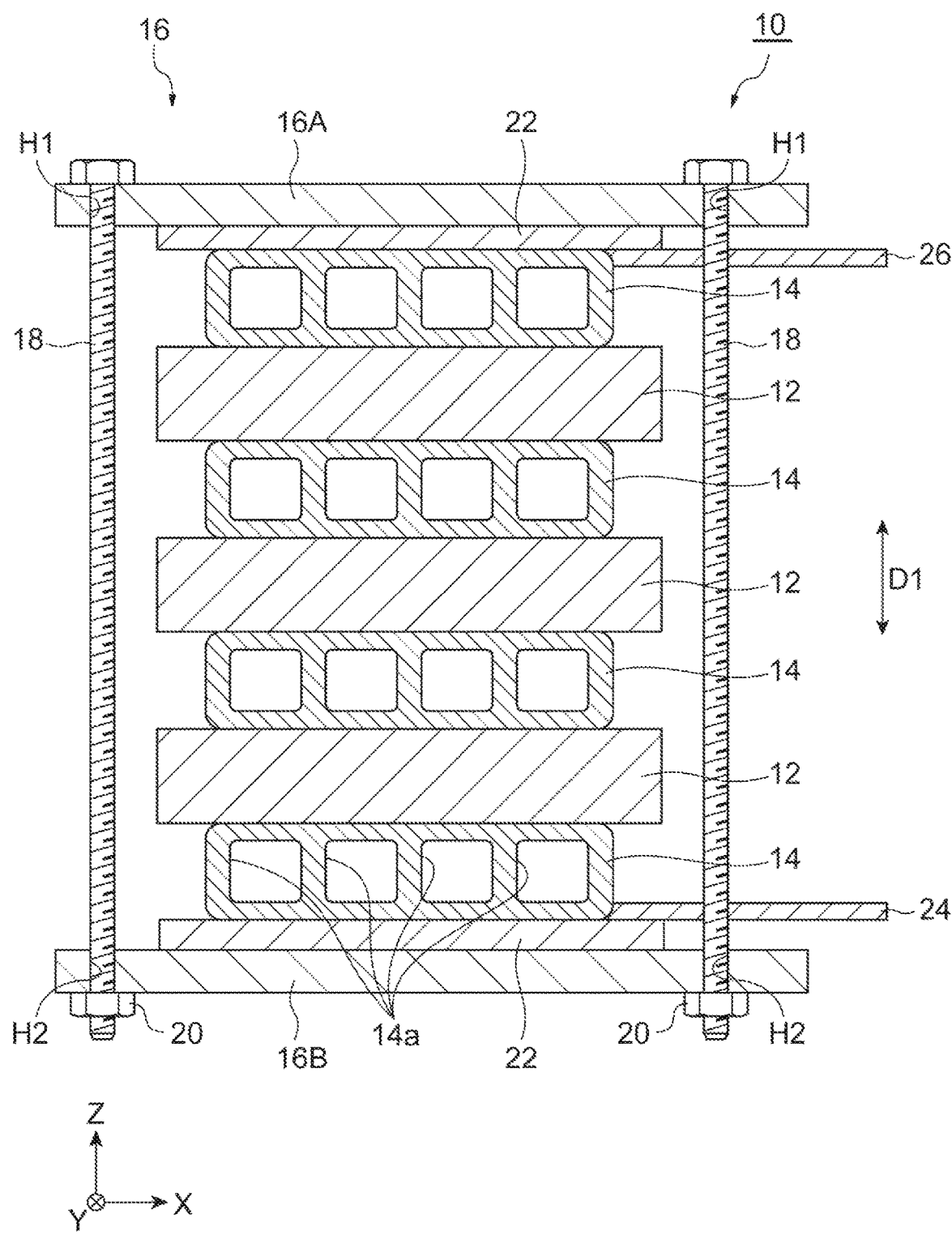
FIG. 1 is a schematic sectional view showing one embodiment of an electricity storage device including an electricity storage module.

Hereinafter, an embodiment of the present invention will be described in detail with reference to the accompanying drawings. In the description of the drawings, the same or identical components are represented by the same reference numerals, and the description thereof will not be repeated. An XYZ rectangular coordinate system is shown in the drawings.

[Configuration of Electricity Storage Device]

FIG. 1 is a schematic sectional view showing one embodiment of an electricity storage device including an electricity storage module. For example, an electricity storage device 10 shown in the drawing is used as batteries of various vehicles such as a forklift, a hybrid vehicle, or an electric vehicle. The electricity storage device 10 includes a plurality of (in the present embodiment, three) electricity storage modules 12 but may include the single electricity storage module 12. The electricity storage module 12 is, for example, a bipolar battery. The electricity storage module 12 is a secondary battery such as a nickel metal hybrid secondary battery or a lithium ion secondary battery but may be an electric double layer capacitor. In the following description, a nickel metal hybrid secondary battery is used as an example.

The electricity storage modules 12 may be laminated, for example, through a conductive plate 14 such as a metal plate. When seen from a laminating direction D1, the electricity storage module 12 and the conductive plate 14 have, for example, a rectangular shape. Each of the electricity storage modules 12 will be described below in detail. The conductive plate 14 is disposed outside of each of the electricity storage modules 12 positioned at opposite ends in a laminating direction D1 (Z direction) of the electricity storage modules 12. The conductive plate 14 is electrically connected to the electricity storage module 12 adjacent thereto. As a result, the electricity storage modules 12 are connected in series in the laminating direction D1. A positive electrode terminal 24 is connected to the conductive plate 14 positioned at one end in the laminating direction D1, and a negative electrode terminal 26 is connected to the conductive plate 14 positioned at the other end in the laminating direction D1. The positive electrode terminal 24 may be integrated with the conductive plate 14 to be connected thereto. The negative electrode terminal 26 may be integrated with the conductive plate 14 to be connected thereto.

The positive electrode terminal 24 and the negative electrode terminal 26 may extend in a direction (X direction) intersecting the laminating direction D1. The electricity storage device 10 can be charged and discharged through the positive electrode terminal 24 and the negative electrode terminal 26.

The conductive plate 14 may function as a heat dissipation plate for dissipating heat generated from the electricity storage module 12. A coolant such as air passes through a plurality of cavities 14a provided in the conductive plate 14 such that heat generated from the electricity storage module 12 can be efficiently dissipated to the outside. Each of the cavities 14a extends, for example, in a direction (Y direction) intersecting the laminating direction D1. When seen from the laminating direction D1, the conductive plate 14 is smaller than the electricity storage module 12 but may be larger than or the same as the electricity storage module 12.

The electricity storage device 10 may include a restraining member 16 that restrains the electricity storage modules 12 and the conductive plates 14, which are alternately laminated, in the laminating direction D1. The restraining member 16 includes: a pair of restraining plates 16A and 16B; and a connection member (a bolt 18 and a nut 20) that connect the restraining plates 16A and 16B to each other. For example, an insulating film 22 such as a resin film is disposed between each of the restraining plates 16A and 16B and the conductive plate 14. Each of the restraining plates 16A and 16B is formed of, for example, metal such as iron. When seen from the laminating direction D1, each of the restraining plates 16A and 16B and the insulating film 22 have, for example, a rectangular shape. The insulating film 22 is larger than the conductive plate 14, and each of the restraining plates 16A and 16B is larger than the electricity storage module 12. When seen from the laminating direction D1, in an edge portion of the restraining plate 16A, an insertion hole H1 into which a shaft portion of the bolt 18 is inserted is provided at a position outside the electricity storage module 12. Likewise, when seen from the laminating direction D1, in an edge portion of the restraining plate 16B, an insertion hole 112 into which a shaft portion of the bolt 18 is inserted is provided at a position outside the electricity storage module 12. In a case where each of the restraining plates 16A and 16B has a rectangular shape when seen from the laminating direction D1, the insertion hole H1 and the insertion hole H2 are positioned at corner portions of the restraining plates 16A and 16B.

The restraining plate 16A abuts against the conductive plate 14 connected to the negative electrode terminal 26 through the insulating film 22, and the restraining plate 16B abuts against the conductive plate 14 connected to the positive electrode terminal 24 through the insulating film 22. For example, the bolt 18 is inserted into the insertion hole H1 from the restraining plate 16A side toward the restraining plate 16B side, and the nut 20 is screwed into a tip of the bolt 18 protruding from the restraining plate 16B. As a result, the insulating film 22, the conductive plate 14, and the electricity storage module 12 are sandwiched to form a unit, and a restraining load is applied in the laminating direction D1.

Figure 2:
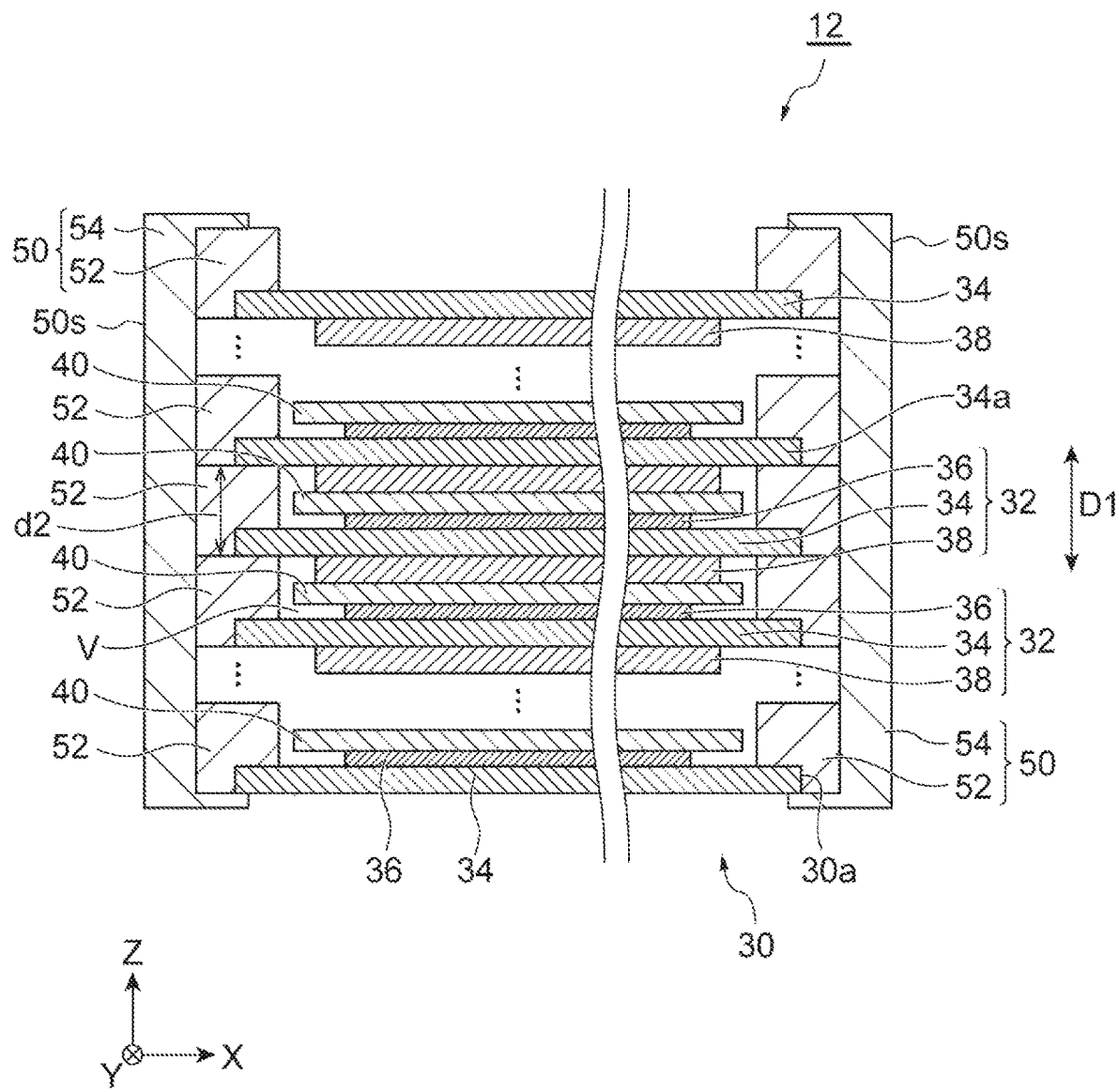
FIG. 2 is a schematic sectional view showing the electricity storage module included in the electricity storage device of FIG. 1.

FIG. 2 is a schematic sectional view showing the electricity storage module included in the electricity storage device of FIG. 1. The electricity storage module 12 shown in the drawing includes a laminate 30 including a plurality of bipolar electrodes (electrodes) 32 that are laminated. When seen from the laminating direction D1 of the bipolar electrodes 32, the laminate 30 has, for example, a rectangular shape. A separator 40 may be disposed between the bipolar electrodes 32 adjacent to each other. The bipolar electrode 32 includes an electrode plate 34, a positive electrode 36 provided on a first surface of the electrode plate 34, and a negative electrode 38 provided on a second surface (a surface opposite to the first surface) of the electrode plate 34. In the laminate 30, the positive electrode 36 of one bipolar electrode 32 faces the negative electrode 38 of the bipolar electrode 32 adjacent thereto in the laminating direction D1 with the separator 40 interposed therebetween, and the negative electrode 38 of one bipolar electrode 32 faces the positive electrode 36 of the other bipolar electrode 32 adjacent thereto in the laminating direction D1 with the separator 40 interposed therebetween. The electrode plate 34 (negative electrode side terminal electrode) in which the negative electrode 38 is disposed on an inner surface is disposed at one end of the laminate 30 in the laminating direction D1, and the electrode plate 34 (positive electrode side terminal electrode) in which the positive electrode 36 is disposed on an inner surface is disposed at the other end of the laminate 30 in the laminating direction D1. The negative electrode 38 of the negative electrode side terminal electrode faces the positive electrode 36 of the bipolar electrode 32 in the uppermost layer with the separator 40 interposed therebetween. The positive electrode 36 of the positive electrode side terminal electrode faces the negative electrode 38 of the bipolar electrode 32 in the lowermost layer with the separator 40 interposed therebetween. Each of the electrode plates 34 of the terminal electrodes is connected to the conductive plate 14 (refer to FIG. 1) adjacent thereto.

The electricity storage module 12 includes a frame body 50 that holds an edge portion 34a of the electrode plate 34 on a side surface 30a of the laminate 30 extending in the laminating direction D1. The frame body 50 is provided around the laminate 30 when seen from the laminating direction D1. That is, the frame body 50 is configured to surround the side surface 30a of the laminate 30. The frame body 50 may include: a first resin portion 52 that holds the edge portion 34a of the electrode plate 34; and a second resin portion 54 that is provided around the first resin portion 52 when seen from the laminating direction D1.

The first resin portion 52 forming an inner wall of the frame body 50 is provided across an end surface of the electrode plate 34 in the edge portion 34a from the first surface (the surface where the positive electrode 36 is formed) of the electrode plate 34 of each of the bipolar electrodes 32. When seen from the laminating direction D1, each of the first resin portions 52 is provided across the entire circumference of the edge portion 34a of the electrode plate 34 of each of the bipolar electrodes 32. The first resin portions 52 adjacent to each other abut against each other on a surface extending to the outside of the second surface (the surface where the negative electrode 38 is formed) of the electrode plate 34 of each of the bipolar electrodes 32. As a result, the edge portion 34a of the electrode plate 34 of each of the bipolar electrodes 32 is buried and held in the first resin portion 52. As in the edge portion 34a of the electrode plate 34 of each of the bipolar electrodes 32, the edge portions 34a of the electrode plates 34 disposed at opposite ends of the laminate 30 are also held in a state where they are buried in the first resin portion 52. As a result, an internal space V that is airtightly partitioned by the electrode plates 34 and 34 adjacent to each other in the laminating direction D1 and the first resin portion 52 is formed between the electrode plates 34 and 34. The internal space V accommodates an electrolytic solution (not shown) formed of, for example, an alkali solution such as an aqueous potassium hydroxide solution.

The second resin portion 54 forming an outer wall of the frame body 50 is a cylindrical portion that extends in the laminating direction D1 as an axis direction. The second resin portion 54 extends across the entire length of the laminate 30 in the laminating direction D1. The second resin portion 54 covers an outer surface of the first resin portion 52 that extends in the laminating direction D1. The second resin portion 54 is welded to the first resin portion 52 on the inside when seen from the laminating direction D1.

The electrode plate 34 is, for example, a rectangular metal foil formed of nickel. The edge portion 34a of the electrode plate 34 is a non-applied region to which a positive electrode active material and a negative electrode active material are not applied. The non-applied region is a region that is buried and held in the first resin portion 52 forming the inner wall of the frame body 50. Examples of the positive electrode active material forming the positive electrode 36 include nickel hydroxide. Examples of the negative electrode active material forming the negative electrode 38 include a hydrogen storage alloy. A region where the negative electrode 38 is formed on the second surface of the electrode plate 34 is much larger than a region where the positive electrode 36 is formed on the first surface of the electrode plate 34.

The separator 40 is formed, for example, in a sheet shape. Examples of a material for forming the separator 40 include a porous film formed of a polyolefin resin such as polyethylene (PE) or polypropylene (PP) and fabric or non-woven fabric formed of polypropylene. The separator 40 may be a separator that is reinforced with a vinylidene fluoride resin compound. The separator 40 is not limited to a sheet shape. A bag-shaped separator may also be used.

The frame body 50 (the first resin portion 52 and the second resin portion 54) is formed in a rectangular cylindrical shape, for example, by injection molding using an insulating resin. Examples of a resin material for forming the frame body 50 include polypropylene (PP), polyphenylene sulfide (PPS), and modified polyphenylene ether (modified PPE).

Figure 3:
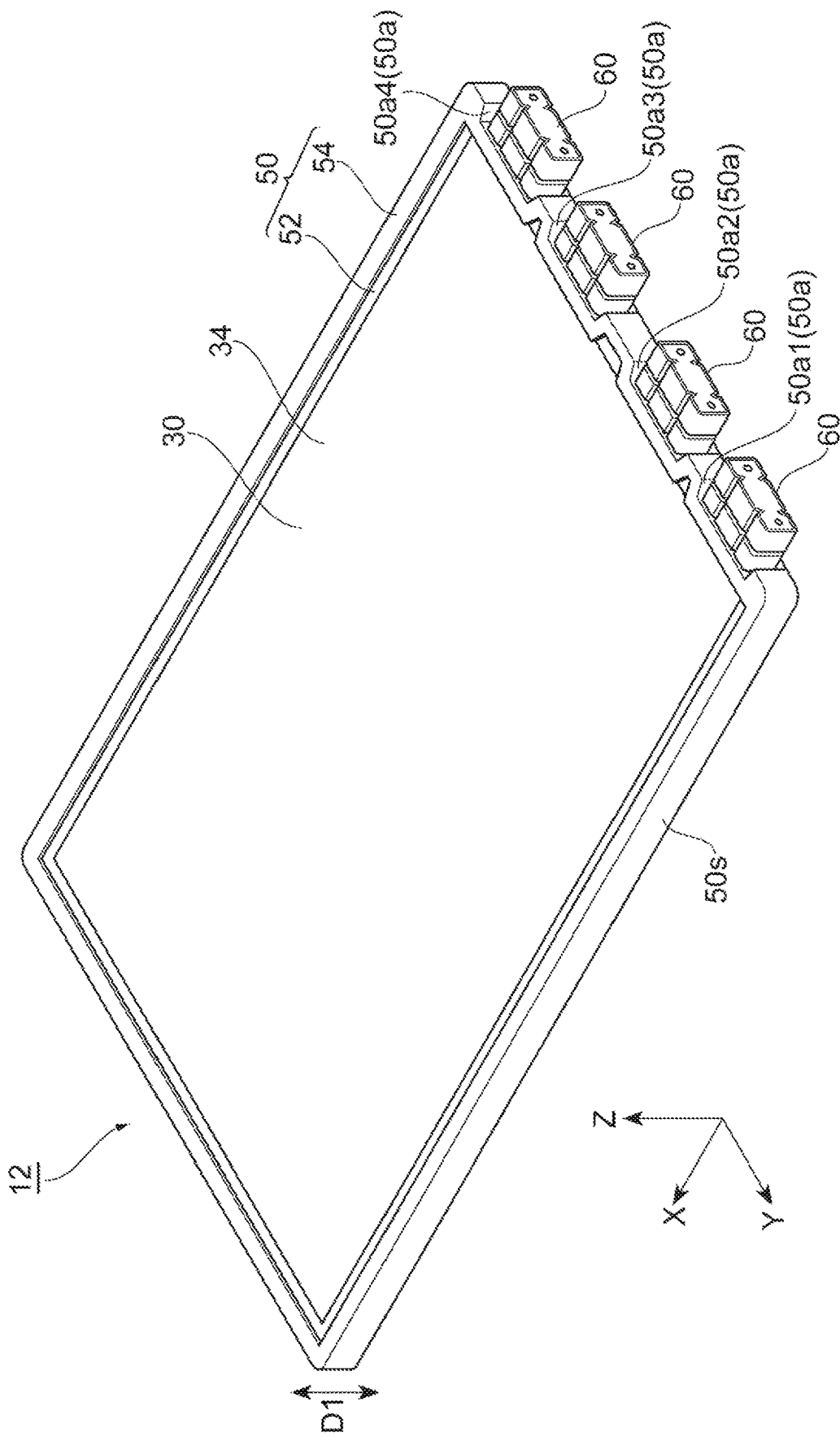
FIG. 3 is a perspective view showing the electricity storage module of FIG. 2.
Figure 4:
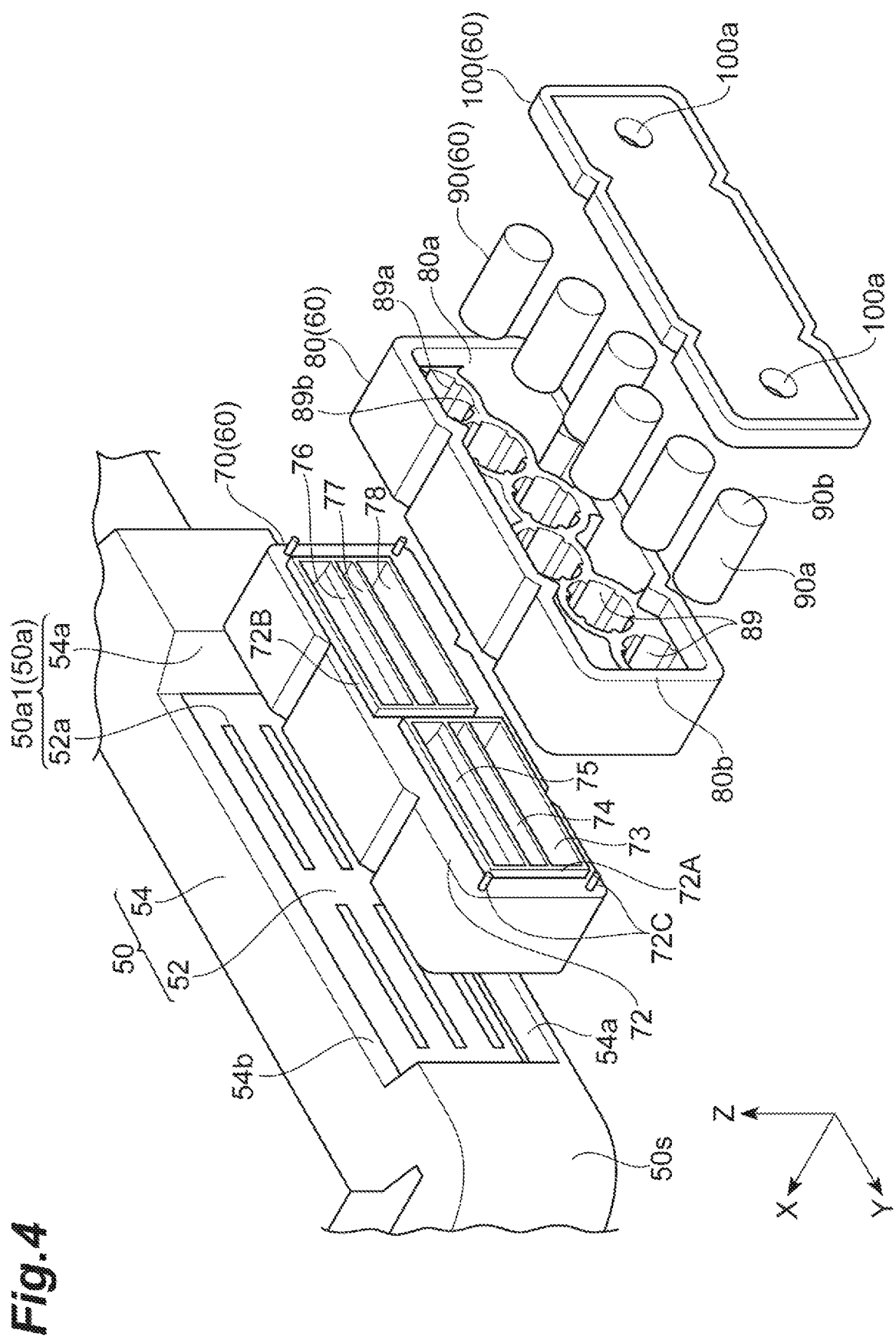
FIG. 4 is an exploded perspective view showing a pressure regulating valve connected to an opening of a frame body.

FIG. 3 is a schematic perspective view showing the electricity storage module 12 of FIG. 2. FIG. 4 is an exploded perspective view showing a pressure regulating valve 60 connected to an opening 50a of the frame body 50. As shown in FIGS. 3 and 4, the frame body 50 of the electricity storage module 12 includes a side surface 50s extending in the laminating direction D1. The side surface 50s is a surface positioned on the outside when seen from the laminating direction D1. Accordingly, the second resin portion 54 includes the side surface 50s of the frame body 50.

On one side surface 50s (here, one side surface 50s facing a longitudinal direction (X direction) of the frame body 50) that forms one side of the frame body 50 when seen from the laminating direction D1, a plurality of (here, four) openings 50a (openings 50a1 to 50a4) are provided. Each of the openings 50a functions as a liquid injection port for injecting the electrolytic solution into each of the internal spaces V, and functions as a connection port of the pressure regulating valve 60 after the injection of the electrolytic solution.

As shown in FIG. 4, one opening 50a includes: a first opening 52a that is provided in the first resin portion 52; and a second opening 54a that is provided in the second resin portion 54. Each of the first openings 52a communicates with the internal space V between the bipolar electrodes 32 adjacent to each other. A plurality of (here, six) first openings 52a are provided in the first resin portion 52, and the single second opening 54a is provided in the second resin portion 54 to cover the first openings 52a. The first opening 52a may be provided in each of the first resin portions 52 or may be provided between the first resin portions 52 adjacent to each other. Each of the first openings 52a and the second opening 54a have, for example, a rectangular shape. In the present embodiment, a notch portion 54b into which a base member 70 of the pressure regulating valve 60 enters is formed in an upper portion of the second opening 54a.

Figure 5:
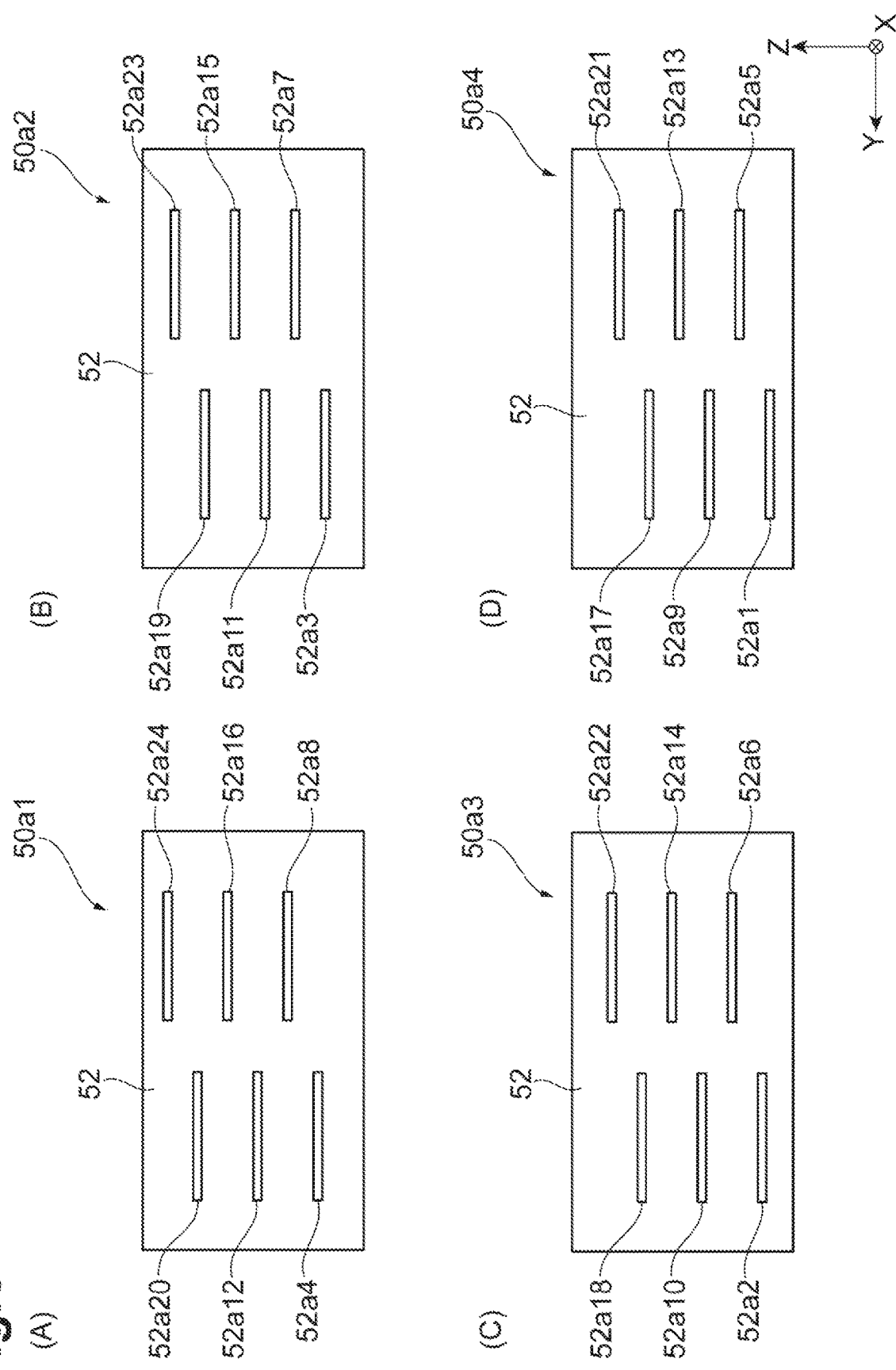
FIG. 5 is a schematic diagram showing respective openings of the frame body.

FIG. 5 is a diagram (diagram when seen from the X direction) showing the respective openings 50a1 to 50a4. FIG. 5 does not show the second resin portion 54 around the first resin portion 52. In the present embodiment, 24 internal spaces V are formed in the electricity storage module 12, and one opening 50a communicates with six internal spaces V of which respective height positions in the laminating direction D1 are offset by four stages. Each of the internal spaces V communicates with any one of the four openings 50a1 to 50a4. As shown in FIG. 5, in one opening 50a, six first openings 52a are dividedly disposed in two columns in a transverse direction (Y direction) of the frame body 50. In each of the columns, three first openings 52a are disposed along the laminating direction D1 (Z direction).

For example, the disposition of the first openings 52a in each of the openings 50a may be configured such that sets of the internal spaces V to communicate with are offset by one stage. In the following description, for convenience of description, to distinguish between 24 internal spaces V, the internal spaces are represented by V1 to V24 in order from the other end (lower side in FIG. 2) to one end (upper side in FIG. 2) of the laminate 30.

As shown in (A) of FIG. 5, in a first column (the left column in the drawing; hereinafter, the same shall be applied) of the opening 50a1, first openings 52a4, 52a12, and 52a20 communicating with the internal spaces V4, V12, and V20 are provided. In a second column (the right column in the drawing; hereinafter, the same shall be applied) of the opening 50a1, first openings 52a8, 52a16, and 52a24 communicating with the internal spaces V8, V16, and V24 are provided.

As shown in (B) of FIG. 5, in a first column of the opening 50a2, first openings 52a3, 52a11, and 52a19 communicating with the internal spaces V3, V11, and V19 are provided. In a second column of the opening 50a2, first openings 52a7, 52a15, and 52a23 communicating with the internal spaces V7, V15, and V23 are provided.

As shown in (C) of FIG. 5, in a first column of the opening 50a3, first openings 52a2, 52a10, and 52a18 communicating with the internal spaces V2, V10, and V18 are provided. In a second column of the opening 50a3, first openings 52a6, 52a14, and 52a22 communicating with the internal spaces V6, V14, and V22 are provided.

As shown in (D) of FIG. 5, in a first column of the opening 50a4, first openings 52a1, 52a9, and 52a17 communicating with the internal spaces V1, V9, and V17 are provided. In a second column of the opening 50a4, first openings 52a5, 52a13, and 52a21 communicating with the internal spaces V5, V13, and V21 are provided.

According to the above-described disposition of the first openings 52a (that is, the correspondence between the first openings 52a1 to 52a24 and the internal spaces V1 to V24), the configuration in which all the internal spaces V communicate with the different first openings 52a is realized.

Figure 6:
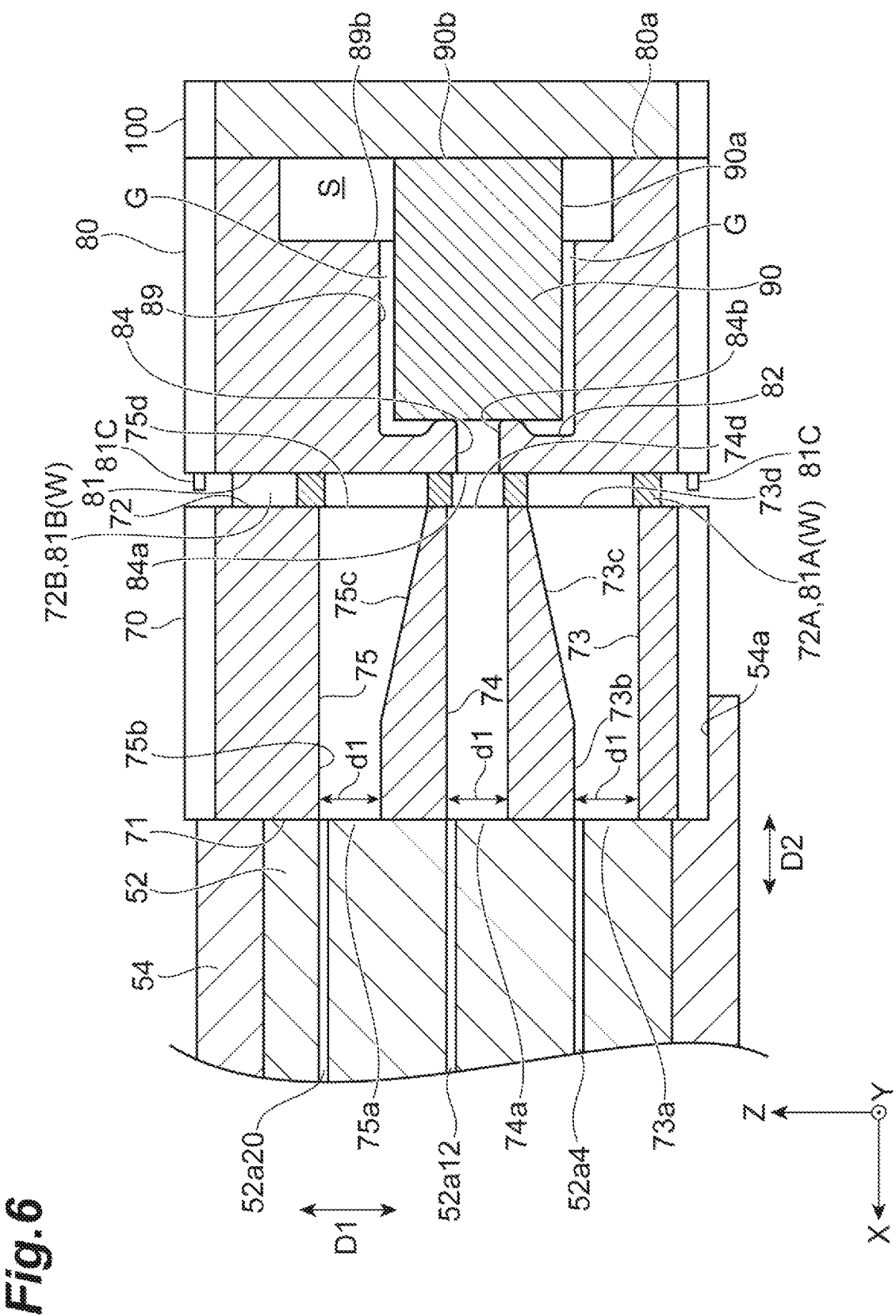
FIG. 6 is a schematic sectional view showing a configuration of the pressure regulating valve.

Next, a configuration of the pressure regulating valve 60 connected to the opening 50a of the frame body 50 will be described with reference to FIGS. 4 and 6 to 11. FIG. 6 is a schematic sectional view showing the configuration of the pressure regulating valve 60. FIG. 6 is a sectional view including a section of a communication path (a communication path formed by the first opening 52a12, a first communication hole 74, and a second communication hole 84) corresponding to the internal space V12. As shown in FIGS. 4 and 6, the pressure regulating valve 60 includes a base member 70 (first member), a case member 80 (second member), a plurality of (here, six) valves 90 (elastic member), and a cover member 100 (third member).

The base member 70 has a substantially rectangular parallelepiped external shape and is formed of, for example, polypropylene (PP), polyphenylene sulfide (PPS), or modified polyphenylene ether (modified PPE). The base member 70 is connected to the opening 50a. When seen from the X direction, a lower surface and opposite side surfaces of the base member 70 are positioned by the second opening 54a. The base member 70 is fixed to the opening 50a, for example, by welding a part or all of a contact portion between a side surface 71 and the first resin portion 52. The welding between the side surface 71 and the first resin portion 52 is performed, for example, by hot plate welding, laser transmission welding, or ultrasonic welding.

(A) of FIG. 7 is a plan view showing the side surface 71, and (B) of FIG. 7 is a plan view showing a side surface 72 (first side surface) of the base member 70. The side surface 72 is a side surface opposite to the opening 50a and faces the case member 80. As shown in FIGS. 6 to 7, in the base member 70, a plurality of (here, six) first communication holes 73 to 78 that penetrate a region from the side surface 71 to the side surface 72 are provided. The first communication holes 73 to 78 communicate with the first openings 52a4, 52a12, 52a20, 52a24, 52a16, and 52a8. A configuration of the first communication holes 76 to 78 is the same as a configuration of the first communication holes 73 to 75. Specifically, the first communication holes 76 to 78 are point-symmetrical to the first communication holes 73 to 75 with respect to an axis A that passes through the centers of the side surfaces 71 and 72 and is perpendicular to the side surfaces 71 and 72. Accordingly, hereinafter, the first communication holes 73 to 75 will be described, and the first communication holes 76 to 78 will not be described.

The first communication hole 74 positioned in the middle stage is formed in a rectangular parallelepiped shape extending along the X direction.

The first communication hole 73 positioned in the lower stage includes: a communication portion 73b having a rectangular parallelepiped shape that extends along the X direction; and a tapered portion 73c that is formed in a tapered shape in which a vertical width (width in the Z direction) increases toward the case member 80 along the X direction. The tapered portion 73c is provided such that a gap between the first communication holes 73 and 74 decreases toward the case member 80 along the X direction. The communication portion 73b forms a section from an open end 73a of the first communication hole 73 on the opening 50a side to an intermediate position of the first communication hole 73, and the tapered portion 73c forms a section from the intermediate position to an open end 73d of the first communication hole 73 on the case member 80 side. The tapered portion 73c has a function of position adjustment for allowing the first communication hole 73 and the second communication hole 83 provided in the case member 80 to communicate with each other.

The first communication hole 75 positioned in the upper stage includes: a communication portion 75b having a rectangular parallelepiped shape that extends along the X direction; and a tapered portion 75c that is formed in a tapered shape in which a vertical width (width in the Z direction) increases toward the case member 80 along the X direction. The tapered portion 75c is provided such that a gap between the first communication holes 74 and 75 decreases toward the case member 80 along the X direction. The communication portion 75b forms a section from an open end 75a of the first communication hole 75 on the opening 50a side to an intermediate position of the first communication hole 75, and the tapered portion 75c forms a section from the intermediate position to an open end 75d of the first communication hole 75 on the case member 80 side. The tapered portion 75c has a function of position adjustment for allowing the first communication hole 75 and the second communication hole 85 provided in the case member 80 to communicate with each other.

The open ends 73a to 75a of the first communication holes 73 to 75 are formed in sizes including the first openings 52a4, 52a12, and 52a20 when seen from the X direction. Vertical widths d1 of the open ends 73a to 75a are the same.

The six first openings 52a in the openings 50a1 to 50a4 are disposed to be offset by one stage as described above. Therefore, to use the pressure regulating valve 60 having the same standards (common shape) for all the opening 50a1 to 50a4, it is necessary that the first communication holes 73 to 78 communicate with the corresponding first openings 52a irrespective of which one of the openings 50a1 to 50a4 the base member 70 of the pressure regulating valve 60 is connected to. For example, the first communication hole 73 of the base member 70 communicates with the first opening 52a4. However, when the base member 70 is connected to the opening 50a2, it is necessary that the first communication hole 73 communicates with the first opening 52a3. When the base member 70 is connected to the opening 50a3, it is necessary that the first communication hole 73 communicates with the first opening 52a2. When the base member 70 is connected to the opening 50a4, it is necessary that the first communication hole 73 communicates with the first opening 52a1.

Therefore, in the present embodiment, the vertical widths d1 of the open ends 73a to 75a are set to be more than or equal to a value obtained by multiplying the width of one repeated structure in the laminate 30 (that is, the offset width corresponding to one stage mentioned above) by the number of the openings 50a. In the present embodiment, the width of one repeated structure in the laminate 30 is a width d2 (refer to FIG. 2) in the laminating direction D1 of a portion including one electrode plate 34 and one internal space V. That is, in the present embodiment, a relationship of "$d1 \geq d2 \times 4$" is satisfied. Thus, irrespective of which one of the openings 50a1 to 50a4 the base member 70 is connected to, the corresponding first opening 52a is accommodated inside each of the open ends 73a to 75a when seen from the X direction. As a result, the same base member 70 (that is, the same pressure regulating valve 60) can be used for any of the openings 50a1 to 50a4. Thus, the kinds of required members can be reduced. It is not necessary to use the pressure regulating valves 60 having different standards depending on the openings 50a, and thus the occurrence of erroneous assembly such as connection of the pressure regulating valve 60 having unsuitable standards to the opening 50a can also be prevented.

Further, as shown in (A) of FIG. 7, the open ends 73a to 78a are disposed to be point-symmetric with respect to the axis A that passes through the center of the side surface 71 and is perpendicular to the side surface 71. According to this configuration, position relationships of the open ends with the openings 50a are the same in any of two states (postures) of the base member 70 that are inverse to each other with respect to the axis A. Therefore, in any of the above two states, the base member 70 can be normally connected to the opening 50a. Specifically, even when the base member 70 is inverted (rotated by 180 degrees) from the state shown in (A) of FIG. 7 with respect to the axis A as a rotation axis, the base member 70 can be connected to the opening 50a1. For example, the first communication hole 73 communicating with the first opening 52a4 communicates with the first opening 52a24 in the above-described inverted state. As a result, the base member 70 can be easily connected to the opening 50a. The occurrence of erroneous assembly such as connection of the base member 70 to the opening 50a in a wrong direction can also be prevented.

As shown in (B) of FIG. 7, first joining protrusion portions 72A and 72B extending along a connection direction D2 (that is, the X direction) of the base member 70 and the case member 80 to partition the first communication holes 73 to 78 from each other when seen from the connection direction D2 are provided on the side surface 72 of the base member 70.

The first joining protrusion portion 72A includes: four wall portions 72A1 that are vertically provided in an edge portion extending along the Y direction of each of the rectangular open ends 73d to 75d; and two wall portions 72A2 that are vertically provided in an edge portion extending along the Z direction of each of the rectangular open ends 73d to 75d. Likewise, the first joining protrusion portion 72B includes: four wall portions 72B1 that are vertically provided in an edge portion extending along the Y direction of each of the rectangular open ends 76d to 78d; and two wall portions 72B2 that are vertically provided in an edge portion extending along the Z direction of each of the open ends 76d to 78d.

A first measurement protrusion portion 72C having a columnar shape that extends in the connection direction D2 is provided at each of four corners of the side surface 72. The first measurement protrusion portion 72C is provided not to interfere second joining protrusion portions 81A and 81B and a second measurement protrusion portion 81C of the case member 80. That is, the first measurement protrusion portion 72C is provided at a position where it does not overlap the second joining protrusion portions 81A and 81B and the second measurement protrusion portion 81C when seen from the connection direction D2.

Figure 8:
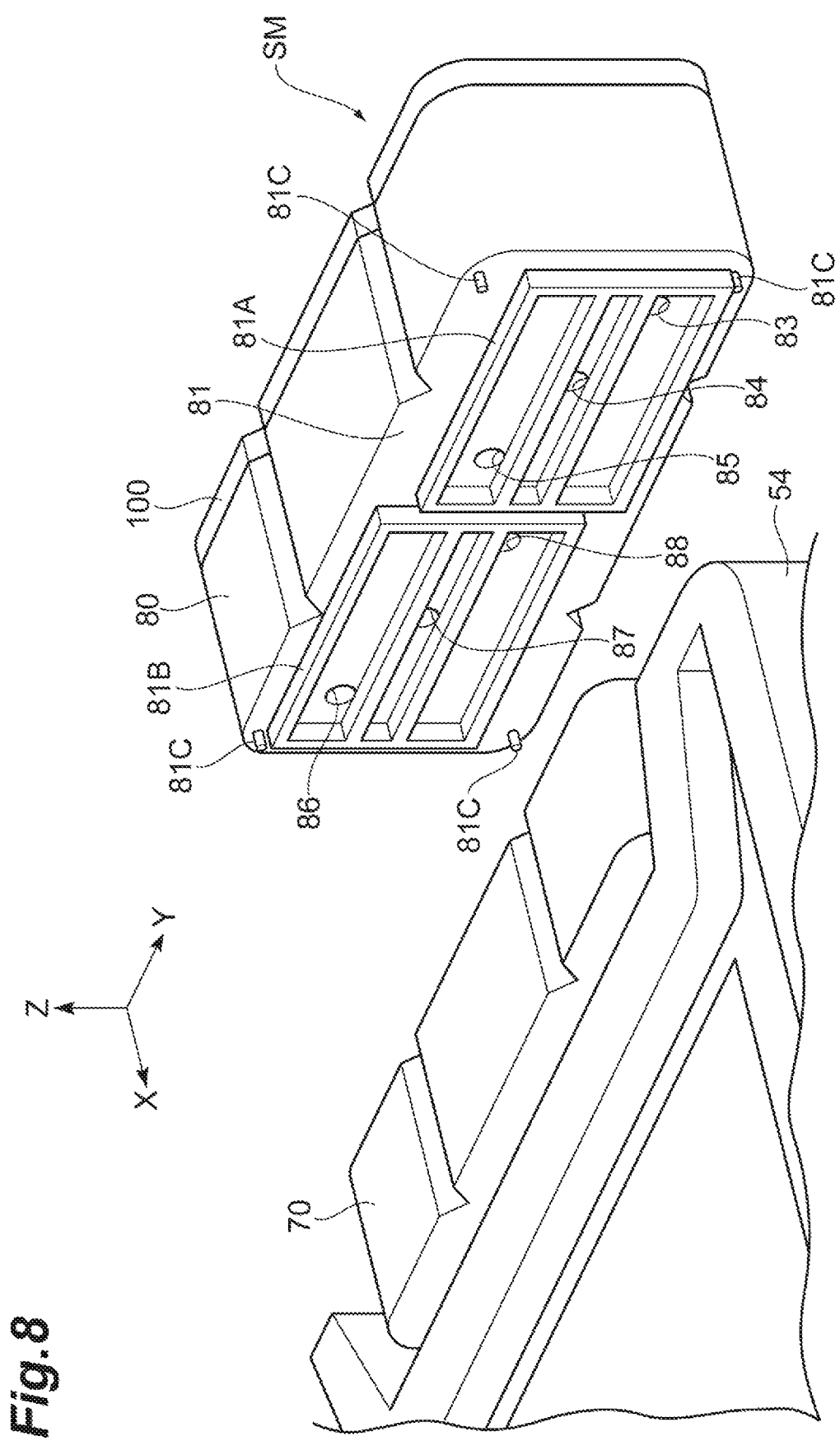
FIG. 8 is an exploded perspective view showing a side surface on the base member side of the case member.

The case member 80 is a box-shaped member having a substantially rectangular parallelepiped external shape and is formed of, for example, polypropylene (PP), polyphenylene sulfide (PPS), or modified polyphenylene ether (modified PPE). The case member 80 is joined to the side surface 72 of the base member 70 on a side surface 81 (second side surface) corresponding to a bottom surface of the box. FIG. 8 is an exploded perspective view showing the side surface 81 of the case member 80. (A) of FIG. 9 is a plan view showing the side surface 81, and (B) of FIG. 9 is a plan view showing the case member 80 when seen from the cover member 100 side.

As shown in FIGS. 8 to 9, in the case member 80, a plurality of (here, six) second communication holes 83 to 88 that penetrate a region from the side surface 81 to an inner surface 82 (an inner surface of a side plate forming the side surface 81) are provided. The second communication holes 83 to 88 are formed in a cylindrical shape. Each of the second communication holes 83 to 88 communicates with one internal space V through the corresponding one of the first communication holes 73 to 78.

As shown in FIG. 8 and (A) of FIG. 9, the second joining protrusion portions 81A and 81B extending along the connection direction D2 (X direction) to partition the second communication holes 83 to 88 from each other when seen from the connection direction D2 are provided on the side surface 81 of the case member 80.

The second joining protrusion portions 81A and 81B have a shape corresponding to the first joining protrusion portions 72A and 72B, and are provided to overlap the first joining protrusion portions 72A and 72B when seen from the connection direction D2. That is, the second joining protrusion portion 81A includes: four wall portions 81A1 corresponding to the four wall portions 72A1; and two wall portions 81A2 corresponding to the two wall portions 72A2. Likewise, the second joining protrusion portion 81B includes: four wall portions 81B1 corresponding to the four wall portions 72B1; and two wall portions 81B2 corresponding to the two wall portions 72B2.

A second measurement protrusion portion 81C having a columnar shape that extends in the connection direction D2 is provided at each of four corners of the side surface 81. The second measurement protrusion portion 81C is provided not to interfere the first joining protrusion portions 72A and 72B and the first measurement protrusion portion 72C. That is, the second measurement protrusion portion 81C is provided at a position where it does not overlap the first joining protrusion portions 72A and 72B and the first measurement protrusion portion 72C when seen from the connection direction D2.

The base member 70 and the case member 80 are joined to each other by welding end portions of the first joining protrusion portions 72A and 72B and end portions of the second joining protrusion portions 81A and 81B by hot plate welding. As a result, the side surface 72 of the base member 70 and the side surface 81 of the case member 80 are connected through a partition wall W extending along the connection direction D2 to partition a plurality of communication paths formed by the first communication holes 73 to 78 and the second communication holes 83 to 88 from each other when seen from the connection direction D2. The partition wall W is a wall portion that is formed by connection of the side surface 72 and the side surface 81 when the first joining protrusion portions 72A and 72B and the second joining protrusion portions 81A and 81B are welded by hot plate welding.

In the hot plate welding, a hot plate is pressed against end portions of the first joining protrusion portions 72A and 72B to be parallel to the end portions. At this time, the hot plate is also pressed against an end portion of the first measurement protrusion portion 72C such that the end portion of the first measurement protrusion portion 72C is solidified after being welded by the hot plate welding. Likewise, in the hot plate welding, the hot plate is pressed against end portions of the second joining protrusion portions 81A and 81B to be parallel to the end portions. At this time, the hot plate is also pressed against an end portion of the second measurement protrusion portion 81C such that the end portion of the second measurement protrusion portion 81C is solidified after being welded by the hot plate welding.

As shown in (B) of FIG. 7 and (A) of FIG. 9, the open ends 73d to 78d provided on the side surface 72 of the base member 70 and a plurality of open ends 83a to 88a (first open ends) provided on the side surface 81 of the case member 80 are point-symmetric with respect to the axis A. The first joining protrusion portions 72A and 72B and the second joining protrusion portions 81A and 81B are also point-symmetric with respect to the axis A. On the other hand, the first measurement protrusion portion 72C and the second measurement protrusion portion 81C are disposed not to be point-symmetric to each other with respect to the axis A. As shown in (B) of FIG. 7, in the present embodiment, the first measurement protrusion portion 72C is provided at an edge portion (short side) along the Z-axis direction at the four corners of the side surface 72. On the other hand, as shown in (A) of FIG. 9, in the present embodiment, the second measurement protrusion portion 81C is provided at an edge portion (long side) along the Y-axis direction at the four corners of the side surface 81. In this way, the first measurement protrusion portion 72C and the second measurement protrusion portion 81C are disposed not to overlap each other when seen from the connection direction D2 even when the case member 80 is inverted upside down (rotated by 180 degrees around the axis A) with respect to the base member 70.

According to this configuration, position relationships of the open ends 83a to 88a with the openings 73d to 78d are the same in any of the two states (postures) of the base member 70 (or the case member 80) that are inverse to each other with respect to the axis A. Even in a case where the case member 80 is inverted around the axis A with respect to the base member 70, the first joining protrusion portions 72A and 72B and the second joining protrusion portions 81A and 81B overlap each other when seen from the connection direction D2. Therefore, in any of the above two states, the case member 80 can be normally joined to the base member 70. Specifically, even when the case member 80 is inverted upside down (rotated by 180 degrees around the axis A) with respect to the base member 70, the case member 80 can be normally joined to the base member 70. As a result, the case member 80 can be easily joined to the base member 70. The occurrence of erroneous assembly such as joining of the case member 80 to the base member 70 in a wrong direction can also be prevented. On the other hand, even in a case where the case member 80 is inverted around the axis A with respect to the base member 70, the first measurement protrusion portion 72C and the second measurement protrusion portion 81C do not overlap each other when seen from the connection direction D2. That is, even when the case member 80 is joined to the base member 70 in any direction in which they are inverse to each other, the first measurement protrusion portion 72C and the second measurement protrusion portion 81C do not overlap each other. Therefore, whether or not hot plate welding is appropriately performed can be checked based on the lengths of the first measurement protrusion portion 72C and the second measurement protrusion portion 81C.

As shown in FIG. 4 and (B) of FIG. 9, on the inside of the case member 80, a cylindrical portion 89 that surrounds each of the open ends 83b to 88b (second open ends opposite to the open ends 83a to 88a) of the inside of the second communication holes 83 to 88 and accommodates the valve 90 for shutting each of the open ends 83b to 88b is provided. The valve 90 is formed in a cylindrical shape, for example, using an elastic member such as rubber. The valve 90 extends in the connection direction D2 in a state where it is accommodated in the cylindrical portion 89. The cylindrical portion 89 is formed in a substantially cylindrical shape conforming to the shape of the valve 90. In the present embodiment, a plurality of cylindrical portions 89 respectively corresponding to the open ends 83b to 88b are connected to each other (a part of each of the cylindrical portions 89 is shared with another cylindrical portion 89) but may be separated from each other.

The valve 90 accommodated in each of the cylindrical portions 89 is disposed to shut each of the open ends 83b to 88b. Specifically, each of the open ends 83b to 88b is formed in a bulging shape in which it bulges toward the valve 90. By pressing the valve 90 against each of the open ends 83*b* to 88*b* having the above-described bulging shape, each of the open ends 83*b* and 88*b* is shut.

The inner diameter of the cylindrical portion 89 is more than the diameter of the valve 90. A plurality of protrusion portions 89*a* for fixing the valve 90 to the cylindrical portion 89 and abutting against a side surface 90*a* of the valve 90 are formed on an inner surface of the cylindrical portion 89. Each of the protrusion portions 89*a* extends along the X direction. The plurality of (here, six) protrusion portions 89*a* are provided at regular intervals (at intervals of 60 degrees around the center axis of the cylindrical portion 89) when seen from the X direction. The side surface 90*a* of the valve 90 is supported by the six protrusion portions 89*a* such that a gap G corresponding to the size of the protrusion portion 89*a* is provided between the side surface 90*a* of the valve 90 and the inner surface of the cylindrical portion 89 (refer to FIG. 6).

The cover member 100 is a plate-shaped member that is joined to an end portion 80*b* of the case member 80 to shut an opening 80*a* of the case member 80. The case member 80 and the cover member 100 are connected to each other to form an accommodation space S that accommodates a plurality of valves 90. The cover member 100 functions as a pressing member that presses the valves 90 against the case member 80 along the connection direction D2 such that the valves 90 are pressed against the respective open ends 83*b* to 88*b*. The cover member 100 is formed of, for example, polypropylene (PP), polyphenylene sulfide (PPS), or modified polyphenylene ether (modified PPE). A method of joining the cover member 100 to the end portion 80*b* of the case member 80 is not particularly limited. For example, laser welding, hot plate welding, or fastening using a fastening member such as a bolt may be used. For example, in a case where laser welding is used, the cover member 100 is formed using a laser transmitting resin, the case member 80 is formed using a laser absorbing resin, and laser is emitted from the cover member 100 side such that a boundary portion between the case member 80 and the cover member 100 can be melted and joined.

A compression ratio of the valve 90 that is pressed against the case member 80 by the cover member 100 is adjusted in advance such that, for example, when an internal pressure of the second communication holes 83 to 88 (that is, an internal pressure of each of the internal spaces V communicating with the second communication holes 83 to 88) is higher than or equal to a predetermined set value, the shutting of the open ends 83*b* to 88*b* by the valve 90 is released.

Next, a mechanism for adjusting the pressure of the internal space V will be described. Here, focusing on the open end 84*b* shown in FIG. 6, a mechanism for adjusting the pressure of the corresponding internal space V12 will be described. The second communication hole 84 communicates with the corresponding internal space V12 through the first communication hole 74 and the first opening 52*a*12. Therefore, the same pressure as that of the internal space V12 is applied to a portion of the valve 90 that shuts the open end 83*b*. As described above, the compression ratio of the valve 90 is defined such that, when an internal pressure of the corresponding internal space V12 is higher than or equal to a predetermined set value, the shutting of the open end 84*b* by the valve 90 is released. Therefore, when the internal pressure of the corresponding internal space V12 is lower than the set value, a closed valve state in which the open end 84*b* is shut by the valve 90 is maintained as shown in FIG. 6.

On the other hand, when the internal pressure of the internal space V12 increases to be higher than or equal to the set value, a part of the valve 90 (specifically, the portion that shuts the open end 84*b* and a peripheral portion thereof) is deformed to be separated from the open end 84*b* such that the open end 84*b* enters an open valve state in which the shutting of the open end 84*b* is released. As a result, gas in the internal space V12 is exhausted from the open end 84*b* in which the shutting is released. Next, when the internal pressure of the internal space V12 is lower than the set value, the valve 90 returns to the original state such that the open end 84*b* enters the closed valve state (the state shown in FIG. 6) again. Through the above-described opening and closing operations, the pressure regulating valve 60 can appropriately adjust the internal pressure of the internal space V12. A mechanism for adjusting the pressure of the internal space V corresponding to each of the other open ends 83*b* and 85*b* to 88*b* is the same as the above-described mechanism.

As described above, the valve 90 is fixed to the cylindrical portion 89 such that the gap G is provided between the inner surface of the cylindrical portion 89 and the valve 90. As a result, when the valve 90 that shuts the open end 84*b* of the second communication hole 84 is separated from the open end 84*b* according to an increase in the internal pressure of the internal space V (here, for example, the internal space V12), gas in the internal space V12 can appropriate escape through the gap G between the valve 90 and the cylindrical portion 89.

An edge surface 89*b* of the cylindrical portion 89 on the cover member 100 side is separated from the cover member 100. As a result, in the above-described open valve state, the gas escaping through the gap G between the valve 90 and the cylindrical portion 89 can further appropriately escape to the accommodation space S between the edge surface 89*b* of the cylindrical portion 89 and the cover member 100.

In the cover member 100, exhaust ports 100*a* (in the example of FIG. 4, two exhaust ports 100*a*) communicating with the accommodation space S and the external space is provided. When a plurality of exhaust ports 100*a* are provided in the cover member 100, exhaust portions can be dispersed. Therefore, application of an excessive pressure to a part of the cover member 100 can be inhibited. However, one exhaust port 100*a* may be provided in the cover member 100. The exhaust port 100*a* exhausts gas flowing from at least one of the internal spaces V into the pressure regulating valve 60 to the external space. As a result, the gas exhausted from the internal space V through the first communication holes 73 to 78 and the second communication holes 83 to 88 can be appropriately exhausted to the external space through the exhaust port 100*a* without being retained in the accommodation space S. In particular, by providing the exhaust port 100*a* in the cover member 100, gas in the accommodation space S (gas having a relatively high temperature) can be exhausted in a direction away from a body of the electricity storage module 12 (direction along the connection direction D2). As a result, an adverse effect of the gas exhausted from the pressure regulating valve 60 on the electricity storage module 12 can be effectively inhibited. The exhaust port 100*a* is provided at a position where it partially overlaps the valves 90 in the cover member 100 when seen from the connection direction D2. However, the exhaust port 100*a* may be provided at a position where it does not overlap the valves 90.

Figure 10:
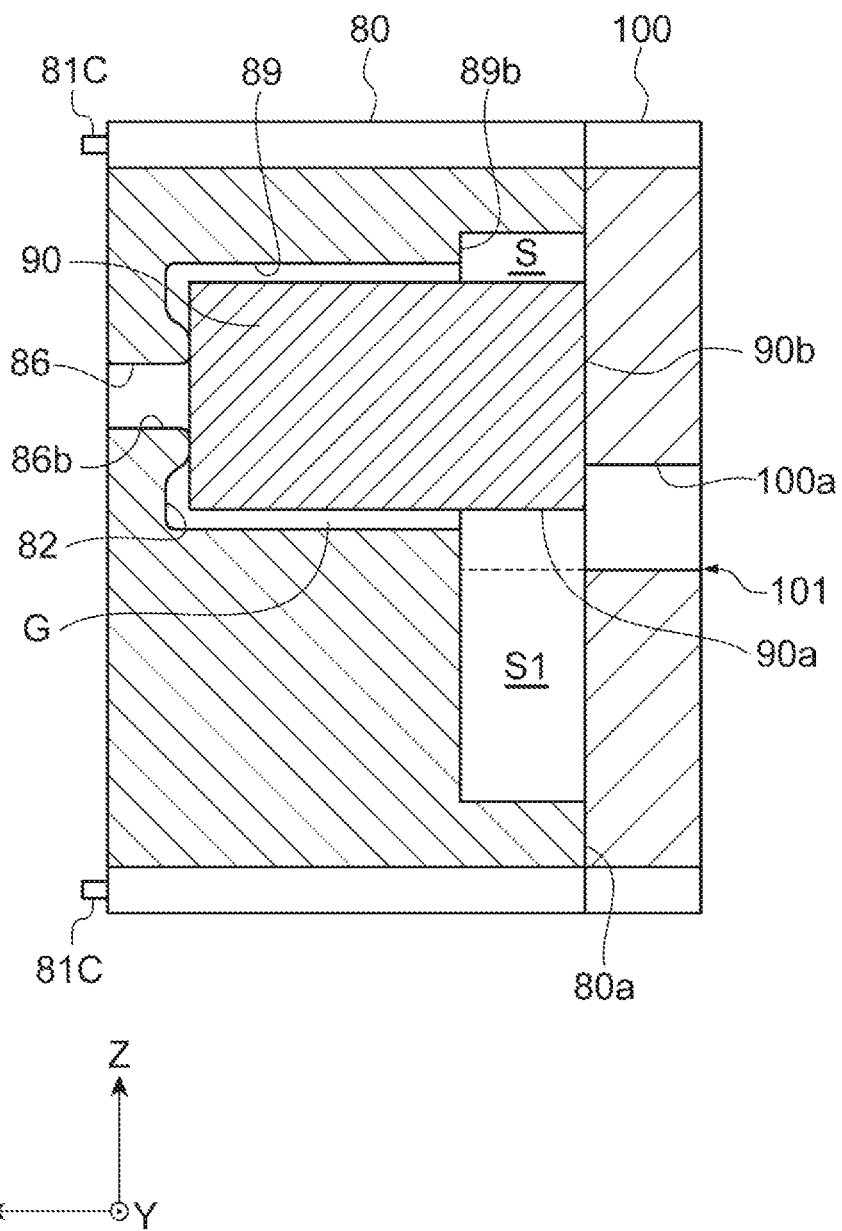
FIG. 10 is a schematic sectional view showing a partial configuration of the pressure regulating valve.
Figure 11:
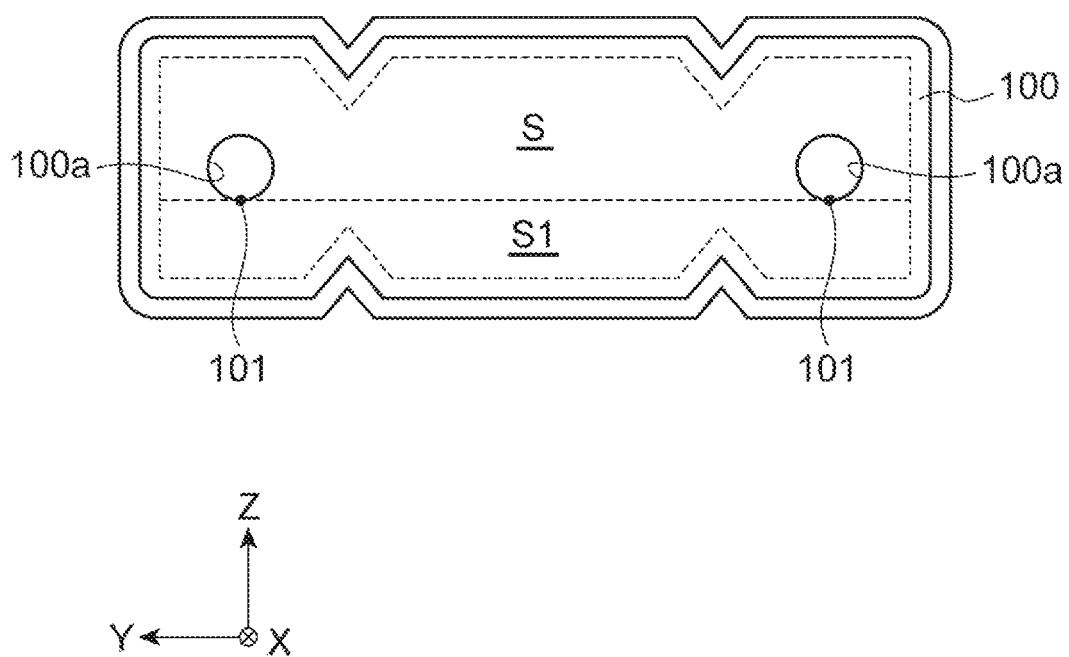
FIG. 11 is a diagram showing a side surface on the cover member side of the pressure regulating valve.

The exhaust port 100*a* and the accommodation space S will be described in detail with reference to FIGS. 10 and 11. FIG. 10 is a sectional view showing a partial configuration of the pressure regulating valve 60. The sectional view of FIG. 10 includes a section of a communication path (a communication path that is formed by the second communication hole 86) corresponding to the internal space V24. FIG. 11 is a diagram showing a side surface of the pressure regulating valve 60 on the cover member 100 side. In FIG. 11, the accommodation space S positioned in rear of the cover member 100 is indicated by a broken line. As shown in FIGS. 10 and 11, the accommodation space S corresponds to a communication space communicating with the exhaust port 100a. The accommodation space S includes a space portion S1 positioned below a lower end 101 of the exhaust port 100a in a vertical direction (in the present embodiment, the Z direction). When the pressure regulating valve 60 is in the open valve state, the space portion S1 is a space for retaining the electrolytic solution flowing into the accommodation space S through the gap G together with the gas. The volume of the space portion S1 may be higher than or equal to the volume of the electrolytic solution accommodated in one internal space V and may be lower than or equal to the total volume of the electrolytic solution accommodated in all the internal spaces V. In the present embodiment, the single accommodation space S including the single space portion S1 communicates with the exhaust ports 100a. For example, however, the accommodation spaces S that are partitioned by a partition portion or the like may communicate with the exhaust ports 100a, respectively. In this case, each of the accommodation spaces S includes the space portion S1. Separately from the accommodation space S that accommodates the valves 90, a communication space communicating with the exhaust port 100a may be provided. In this case, the communication space includes a space portion positioned below the lower end 101 of the exhaust port 100a.

As described above, the electricity storage module 12 according to the present embodiment includes: the laminate 30 including the bipolar electrodes 32 that are laminated; the frame body 50 holding the edge portion 34a of the electrode plate 34 and including the opening 50a that communicates with the internal spaces V provided in the laminate 30; and the pressure regulating valve 60 connected to the opening 50a. Each of the bipolar electrode 32 includes the electrode plate 34, the positive electrode 36 provided on the first surface of the electrode plate 34, and the negative electrode 38 provided on the second surface of the electrode plate 34. Each of the internal spaces V is provided between the bipolar electrode 32 adjacent to each other in the laminate 30. The pressure regulating valve 60 includes: the base member 70 in which the first communication holes 73 to 78 communicating with the internal spaces V through the opening 50a are provided and that is connected to the opening 50a; the case member 80 in which the second communication holes 83 to 88 communicating with the first communication holes 73 to 78 are provided and that is joined to the side surface 72 of the base member 70; the valves 90 that shuts the open ends 83b to 88b of the second communication holes 83 to 88; and the cover member 100 that presses the valves 90 against the case member 80 along the connection direction D2 such that the valves 90 are pressed against the open ends 83b to 88b.

In the electricity storage module 12, the pressure regulating valve 60 including the valves 90 that shut the exit-side open ends 83b to 88b of the communication holes (the first communication holes 73 to 78 and the second communication holes 83 to 88) respectively communicating with the plurality of (in the present embodiment, six) internal spaces V is provided. That is, to adjust the pressures of internal spaces V of the laminate 30 of the bipolar electrodes 32, one pressure regulating valve 60 that is shared by the internal spaces V is provided. As a result, the configuration for adjusting the pressures of the internal spaces V between the bipolar electrodes 32 can be simplified.

The electricity storage module 12 includes a plurality of (in the present embodiment, four) pressure regulating valves 60. In the frame body 50, a plurality of (four) openings 50a (50a1 to 50a4) to which the pressure regulating valves 60 are connected are provided. The openings 50a communicate with the internal spaces V that are different depending on the openings 50a. In this way, by providing the openings 50a in the frame body 50, the number of internal spaces V communicating with one opening 50a (that is, the number of internal spaces V as targets of which the pressures are to be adjusted by one pressure regulating valve 60; the number of communication holes required to provide one pressure regulating valve 60) can be reduced as compared to a case where one opening 50a is provided. As a result, the sectional area of one first communication hole and the sectional area of one second communication hole in the pressure regulating valve 60 can be increased, and the flow of air in the communication holes can be smoothly performed.

The base member 70 and the case member 80 are connected through the partition wall W extending along the connection direction D2 to partition a plurality of communication paths formed by the first communication holes 73 to 78 and the second communication holes 83 to 88 from each other. If the side surface 71 of the base member 70 and the side surface 81 of the case member 80 are joined by welding, joint portions between the first communication holes 73 to 78 and the second communication holes 83 to 88 may be shut by the melted base member 70 or case member 80. On the other hand, in the configuration where the base member 70 and the case member 80 are joined through the partition wall W as described above (for example, the configuration where the base member 70 and the case member 80 are joined by hot plate welding), the possibility of the shutting of the above-described joint portions by the joining between the base member 70 and the case member 80 can be reduced.

On the side surface 72, the first joining protrusion portions 72A and 72B extending along the connection direction D2 to partition the first communication holes 73 to 78 from each other when seen from the connection direction D2 and the first measurement protrusion portion 72C extending along the connection direction D2 are provided. On the side surface 81, the second joining protrusion portions 81A and 81B extending along the connection direction D2 to partition the second communication holes 83 to 88 when seen from the connection direction D2 such that the second joining protrusion portions 81A and 81B corresponds to the first joining protrusion portion 72A and 72B and the second measurement protrusion portion 81C extending along the connection direction D2 not to overlap the first measurement protrusion portion 72C when seen from the connection direction D2 are provided. The first joining protrusion portions 72A and 72B and the second joining protrusion portions 81A and 81B are joined by hot plate welding. The end portion of the first measurement protrusion portion 72C and the end portion of the second measurement protrusion portion 81C are solidified after being welded by the above hot plate welding.

In this configuration, the first measurement protrusion portion 72C and the second measurement protrusion portion 81C are provided not to overlap each other when seen from the connection direction D2. Therefore, a length c of the first measurement protrusion portion 72C in the connection direction D2 is equal to lengths of the first joining protrusion portions 72A and 72B in the connection direction D2 after the end portions come into contact with the hot plate to be welded (the lengths before the first joining protrusion portions 72A and 72B and the second joining protrusion portions 81A and 81B abut against each other and are pushed). Likewise, a length d of the second measurement protrusion portion 81C in the connection direction D2 is equal to lengths of the second joining protrusion portions 81A and 81B in the connection direction D2 after the end portions come into contact with the hot plate to be welded (the lengths before the first joining protrusion portions 72A and 72B and the second joining protrusion portions 81A and 81B abut against each other and are pushed). Accordingly, according to the electricity storage module 12, based on a length a of the first joining protrusion portions 72A and 72B in the connection direction before hot plate welding, a length b of the second joining protrusion portions 81A and 81B in the connection direction before hot plate welding, the above-described length c of the first measurement protrusion portion 72C, the above-described length d of the second measurement protrusion portion 81C, and an interval e between the side surface 72 and the side surface 81 in the connection direction D2, the melting amount (=a−c) of the first joining protrusion portions 72A and 72B, the melting amount (=b−d) of the second joining protrusion portions 81A and 81B, and the push amount (=c+d−e) between the base member 70 and the case member 80 can be calculated. As a result, in the configuration of the pressure regulating valve 60 including the base member 70 and the case member 80 that are joined to each other by hot plate welding, whether or not hot plate welding is appropriately performed can be easily checked based on the melting amounts and the push amount of the respective portions (the first joining protrusion portions 72A and 72B and the second joining protrusion portions 81A and 81B) that are calculated as described above.

The first measurement protrusion portions 72C are provided on the side surface 72. In particular, in the present embodiment, four first measurement protrusion portions 72C are provided at four corners of the side surface 72. In this case, when the first joining protrusion portions 72A and 72B and the first measurement protrusion portion 72C come into contact with the hot plate, the parallelism between the hot plate and the side surface 72 can be checked based on the presence or absence, the degree, and the like of a variation in the lengths of the first measurement protrusion portions 72C in the connection direction D2. That is, whether or not the hot plate is pressed against the first joining protrusion portions 72A and 72B and the first measurement protrusion portion 72C in an appropriate posture (in a posture parallel to the side surface 72) can be checked.

The second measurement protrusion portions 81C are provided on the side surface 81. In particular, in the present embodiment, four second measurement protrusion portions 81C are provided at four corners of the side surface 81. In this case, when the second joining protrusion portions 81A and 81B and the second measurement protrusion portion 81C come into contact with the hot plate, the parallelism between the hot plate and the side surface 81 can be checked based on the presence or absence, the degree, and the like of a variation in the lengths of the second measurement protrusion portions 81C in the connection direction D2. That is, whether or not the hot plate is pressed against the second joining protrusion portions 81A and 81B and the second measurement protrusion portion 81C in an appropriate posture (in a posture parallel to the side surface 81) can be checked.

Further in the electricity storage module 12, the accommodation space S includes the space portion S1 positioned below the lower end 101 of the exhaust port 100a. Accordingly, even when the electrolytic solution of the internal space V flows into the accommodation space S of the pressure regulating valve 60 together with gas, the space portion S1 is present below the lower end 101 of the exhaust port 100a, and thus the electrolytic solution remains in the space portion S1. Accordingly, the exhaust of the electrolytic solution to the external space through the exhaust port 100a of the pressure regulating valve 60 can be inhibited.

Typically, the electrolytic solutions accommodated in the internal spaces V are not likely to simultaneously reach the accommodation space S, and the electrolytic solution accommodated in one internal space V reaches the accommodation space S. Therefore, this configuration is useful when the volume of the space portion S1 is higher than or equal to the volume of the electrolytic solution accommodated in one internal space V. As a result, even when substantially all the electrolytic solution accommodated in one internal space V flows into the pressure regulating valve 60, substantially all the electrolytic solution can be retained in the space portion S1.

[Method of Manufacturing Electricity Storage Device]

Hereinafter, an example of a method of manufacturing the electricity storage device 10 shown in FIG. 1 (including a method of manufacturing the electricity storage module 12) will be described.

(Laminating Step)

First, for example, the bipolar electrodes 32 are laminated through the separator 40 to obtain the laminate 30. In the present embodiment, before the laminating step, the first resin portion 52 is formed, for example by injection molding on the edge portion 34a of the electrode plate 34 of each of the bipolar electrodes 32. A configuration in which the second resin portion 54 is excluded from the configuration shown in FIG. 2 is obtained through the laminating step.

(Frame Body Forming Step)

Next, the second resin portion 54 is formed, for example, by injection molding. As a result, as shown in FIGS. 2 and 3, the frame body 50 including the first resin portion 52 and the second resin portion 54 is formed. In the present embodiment, the first resin portion 52 that is a part of the frame body 50 is formed before the laminating step, and the second resin portion 54 that is the remainder of the frame body 50 is formed after the laminating step. However, the first resin portion 52 that is a part of the frame body 50 may be formed after the laminating step.

(Base Member Connecting Step)

Next, the base member 70 is connected to the opening 50a. As described above, the base member 70 is fixed to the opening 50a, for example, by welding a part or all of the contact portion between the side surface 71 of the base member 70 and the first resin portion 52. The welding between the side surface 71 and the first resin portion 52 is performed, for example, by hot plate welding, laser transmission welding, or ultrasonic welding. As a result, the base member 70 is fixed to the opening 50a.

(Electrolytic Solution Injecting Step)

Next, the electrolytic solution is injected into each of the internal spaces V (in the present embodiment, six internal spaces V communicating with the opening 50a to which the base member 70 is connected) through each of the first communication holes 73 to 78 provided in the base member 70. By injecting the electrolytic solution while managing the amount of the electrolytic solution for each of the first communication holes 73 to 78, the amount of the electrolytic solution can be managed for each of the internal spaces V. Before the injection of the electrolytic solution, to inspect whether or not each of the internal spaces V in the electricity storage module 12 is reliably sealed, evacuation for each of the internal spaces V (operation of removing air) may be performed through the first communication holes 73 to 78. As a result, airtightness of each of the internal spaces V can be inspected before the injection of the electrolytic solution. The injection of the electrolytic solution through the base member 70 may be performed using a dedicated jig or the like.

(Preparation Step)

Next, a pressure regulating valve submodule SM (refer to FIG. 8) as a unit including the case member 80, a plurality of valves 90, and the cover member 100 is prepared. The pressure regulating valve submodule SM is formed by accommodating the valve 90 in each of the cylindrical portions 89 provided inside the case member 80 and assembling the cover member 100 with the case member 80.

(Inspection Step)

Next, the pressure regulating valve submodule SM prepared in the preparation step is inspected. As a result, whether or not the function as the pressure regulating valve 60 is normally exhibited can be checked in advance. Specifically, by sending air into the respective second communication holes 83 to 88 through the open ends 83a to 88a of the respective second communication holes 83 to 88 provided in the case member 80, the operation of the pressure regulating valve submodule SM is inspected. More specifically, whether or not valve opening pressures of the valves 90 included in the pressure regulating valve submodule SM are normal is inspected. The operation of sending air into the respective second communication holes 83 to 88 through the respective open ends 83a to 88a may be performed using a dedicated jig or the like. In the inspection step, a pressure value when the shutting of the open ends 83b to the 88b by the valve 90 is released, is checked for each of the second communication holes 83 to 88. The pressure value is compared to a preset pressure value. For example, when an error between the pressure value and the preset pressure value is less than or equal to an allowable error, it is determined that the valve opening pressure of the valve 90 is normal. On the other hand, when the error is more than the allowable error, it is determined that the valve opening pressure of the valve 90 is abnormal. When it is determined that the valve opening pressure of the valve 90 is normal for all the second communication holes 83 to 88 through the above-described inspection, it is determined that the inspected pressure regulating valve submodule SM is normal. On the other hand, when it is determined that the valve opening pressure of the valve 90 is abnormal for at least one of the second communication holes 83 to 88 through the above-described inspection, it is determined that the inspected pressure regulating valve submodule SM is abnormal.

(Joining Step)

Next, the base member 70 and the case member 80 of the inspected pressure regulating valve submodule SM that is determined to be normal in the inspection step are joined to each other such that the first communication holes 73 to 78 and the second communication holes 83 to 88 communicate with each other. As described above, the joining is performed by hot plate welding between the first joining protrusion portions 72A and 72B provided on the side surface 72 of the base member 70 and the second joining protrusion portions 81A and 81B provided on the side surface 81 of the case member 80.

The joining step will be described with reference to FIG. 12. FIG. 12 is a diagram schematically showing the procedure of the joining step. First, a hot plate HP is prepared ((A) of FIG. 12). Next, the hot plate HP is brought into contact with the respective end portions of the first joining protrusion portions 72A and 72B, the second joining protrusion portions 81A and 81B, the first measurement protrusion portion 72C, and the second measurement protrusion portion 81C ((B) of FIG. 12). As a result, the respective end portions of the first joining protrusion portions 72A and 72B, the second joining protrusion portions 81A and 81B, the first measurement protrusion portion 72C, and the second measurement protrusion portion 81C are melted. The length of the each of the protrusion portions in the connection direction D2 is reduced by the melting amount of the end portion of each of the protrusion portions. Before the contact of the hot plate HP, the length of the first measurement protrusion portion 72C in the connection direction D2 is equal to the length a of the first joining protrusion portions 72A and 72B in the connection direction D2. Likewise, before the contact of the hot plate HP, the length of the second measurement protrusion portion 81C in the connection direction D2 is equal to the length b of the second joining protrusion portions 81A and 81B in the connection direction D2.

Next, by allowing the melted end portions of the first joining protrusion portions 72A and 72B and the melted end portions of the second joining protrusion portions 81A and 81B to abut against each other, the first joining protrusion portions 72A and 72B and the second joining protrusion portions 81A and 81B are joined to each other. In this way, the partition wall W connecting the side surface 72 and the side surface 81 is formed by welding the first joining protrusion portions 72A and 72B and the second joining protrusion portions 81A and 81B by hot plate welding ((C) of FIG. 12).

Next, as shown in FIG. 1, the electricity storage modules 12 are laminated through the conductive plate 14. The positive electrode terminal 24 and the negative electrode terminal 26 are connected in advance to the conductive plates 14 positioned at opposite ends in the laminating direction D1, respectively. Next, a pair of restraining plates 16A and 16B are disposed at opposite ends in the laminating direction D1 through the insulating film 22. Next, the shaft portion of the bolt 18 is inserted into the insertion hole H1 of the restraining plate 16A and is inserted into the insertion hole H2 of the restraining plate 16B. Next, the nut 20 is screwed into the tip of the bolt 18 protruding from the restraining plate 16B. In this way, the electricity storage device 10 shown in FIG. 1 is manufactured.

As described above, the method of manufacturing the electricity storage module according to the present embodiment includes the laminating step, the frame body forming step, the base member connecting step, the preparation step, and the joining step. In this manufacturing method, by joining the pressure regulating valve submodule SM to the member in which the base member 70 is connected to the laminate 30 and the frame body 50, one pressure regulating valve 60 that is shared by the internal spaces V of the laminate 30 can be easily mounted. Accordingly, according to the above-described manufacturing method, the configuration for adjusting the pressures in the internal spaces V between the bipolar electrodes 32 can be simplified, and the manufacturing steps of the electricity storage module 12 having the configuration can be simplified.

Before the joining step and after the connecting step, the manufacturing method further includes the electrolytic solution injecting step of injecting the electrolytic solution into the internal spaces V through the first communication holes 73 to 78. In the electrolytic solution injecting step, the injection of the electrolytic solution into each of the internal spaces V of the laminate 30 can be easily performed using the first communication holes 73 to 78 provided in the base member 70.

Before the joining step and after the preparation step, the above-described method further includes the inspection step of inspecting the operation of the pressure regulating valve submodule SM by sending air into the second communication holes 83 to 88 through the open ends 83a to 88a of the second communication holes 83 to 88. In the joining step, the base member 70 and the case member 80 of the inspected pressure regulating valve submodule SM are joined. In this case, before joining the pressure regulating valve submodule SM to the base member 70, the operation of the pressure regulating valve submodule SM (for example, the valve opening pressure of each of the valves 90) can be inspected using the second communication holes 83 to 88 provided in the pressure regulating valve submodule SM. As a result, the yield of the finally manufactured electricity storage module 12 can be improved.

In the above-described manufacturing method, the base member 70 and the case member 80 are joined to each other by welding the end portions of the first joining protrusion portions 72A and 72B and the end portions of the second joining protrusion portions 81A and 81B by hot plate welding in the joining step. By such hot plate welding between the protrusion portions, the possibility of the shutting of the joint portions between the first communication holes 73 to 78 and the second communication holes 83 to 88 can be reduced when the base member 70 and the case member 80 are joined.

The above-described joining step includes: the step (refer to (B) of FIG. 12) of bringing the hot plate into contact with the respective end portions of the first joining protrusion portions 72A and 72B, the second joining protrusion portions 81A and 81B, the first measurement protrusion portion 72C, and the second measurement protrusion portion 81C; and the step (refer to (C) of FIG. 12) of joining the first joining protrusion portions 72A and 72B and the second joining protrusion portions 81A and 81B to each other by allowing the melted end portions of the first joining protrusion portions 72A and 72B and the melted end portions of the second joining protrusion portions 81A and 81B to abut against each other. In this manufacturing method, the base member 70 including the first measurement protrusion portion 72C and the second measurement protrusion portion 81C that are provided not to overlap each other when seen from the connection direction D2 and the case member 80 are joined by hot plate welding. As a result, the length c of the first measurement protrusion portion 72C in the connection direction D2 after hot plate welding is equal to the lengths of the first joining protrusion portions 72A and 72B in the connection direction D2 after the end portions come into contact with the hot plate to be welded (the lengths before the first joining protrusion portions 72A and 72B and the second joining protrusion portions 81A and 81B abut against each other and are pushed). The length d of the second measurement protrusion portion 81C in the connection direction D2 after hot plate welding is equal to lengths of the second joining protrusion portions 81A and 81B in the connection direction D2 after the end portions come into contact with the hot plate to be welded (the lengths before the first joining protrusion portions 72A and 72B and the second joining protrusion portions 81A and 81B abut against each other and are pushed). Accordingly, according to the method of manufacturing the electricity storage module 12, the electricity storage module 12 can be obtained in which based on the length a of the first joining protrusion portions 72A and 72B in the connection direction D2 before hot plate welding, the length b of the second joining protrusion portions 81A and 81B in the connection direction D2 before hot plate welding, the length c of the first measurement protrusion portion 72C, the length d of the second measurement protrusion portion 81C, and the interval e between the side surface 72 and the side surface 81 in the connection direction D2, the melting amount (=a−c) of the first joining protrusion portions 72A and 72B, the melting amount (=b−d) of the second joining protrusion portions 81A and 81B, and the push amount (=c+d−e) between the base member 70 and the case member 80 can be calculated. As a result, in the configuration of the pressure regulating valve 60 including the base member 70 and the case member 80 that are joined to each other by hot plate welding, whether or not hot plate welding is appropriately performed can be easily checked based on the melting amounts and the push amount of the respective portions (the first joining protrusion portions 72A and 72B and the second joining protrusion portions 81A and 81B) that are calculated as described above.

Hereinabove, the preferable embodiments of the present invention have been described in detail, but the invention is not limited to the above-described embodiments. For example, in the pressure regulating valve 60, the first measurement protrusion portion 72C and the second measurement protrusion portion 81C are not necessarily provided. In the present embodiment, the configuration in which one valve 90 shuts one open end (any one of the open ends 83b to 88b) is adopted. For example, a configuration in which one plate-shaped valve shuts a plurality of open ends (that is, a configuration in which one valve is used commonly for a plurality of open ends) may be adopted. The case member 80 may be integrated with the base member 70. In this case, the base member integrated with the case member 80 includes the accommodation space S and the space portion S1.

Figure 13:
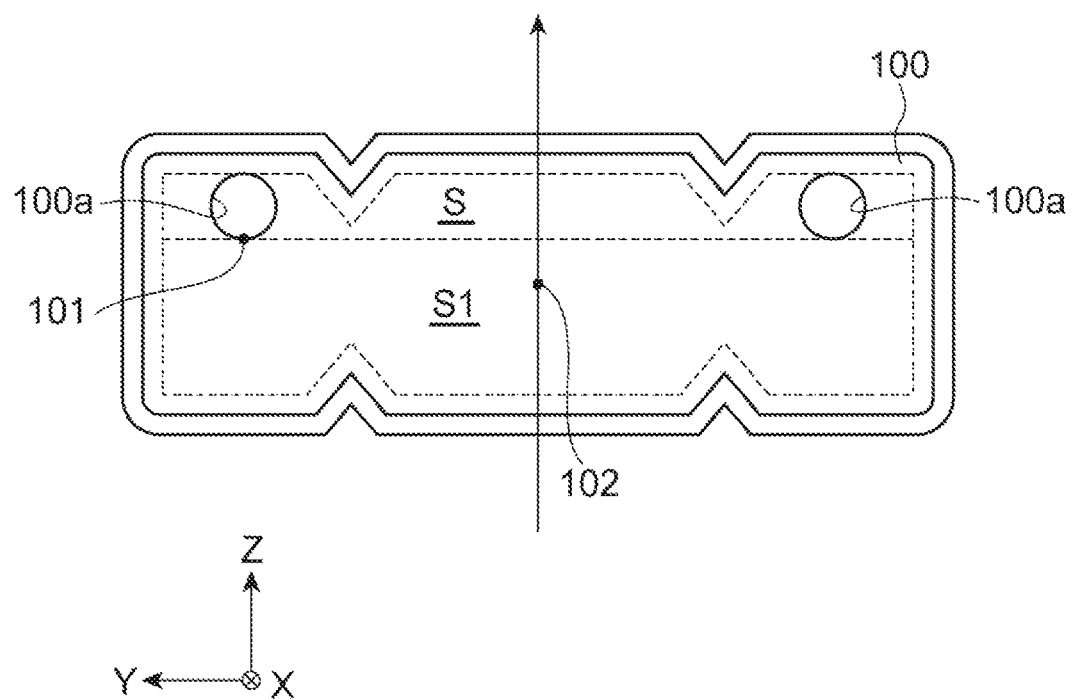
FIG. 13 is a diagram showing a side surface on the cover member side of a pressure regulating valve according to a modification example.

FIG. 13 is a diagram showing a side surface of the pressure regulating valve 60 on the cover member 100 side according to a modification example. The pressure regulating valve 60 according to the present modification example has the same configuration as the pressure regulating valve 60 shown in FIG. 3 or the like, except that the position of the exhaust port 100a is different. In the pressure regulating valve 60 according to the present modification example, the lower ends 101 of the exhaust ports 100a are positioned above a center 102 of the pressure regulating valve 60 in the vertical direction (in the present embodiment, the Z direction). The center 102 corresponds to the intermediate point of the maximum dimension of the pressure regulating valve 60 in the vertical direction. In this case, the volume of the space portion S1 positioned below the lower ends 101 of the exhaust ports 100a can be made to be relatively high. Accordingly, the electrolytic solution having a higher volume can be retained in the space portion S1.

The positions of the lower ends 101 of the exhaust ports 100a in the vertical direction may vary depending on the exhaust ports 100a. In this case, the single space portion S1 may be positioned below the lower end 101 positioned on the lowermost side among the lower ends 101 of the exhaust ports 100a, or the space portions S1 that are separated from each other may be positioned below the lower ends 101 of the exhaust ports 100a, respectively. When the single space portion S1 is provided for the exhaust ports 100a, the space portion S1 can be shared. Therefore, the electrolytic solution having a higher volume can be retained in the space portion S1.

Figure 14:
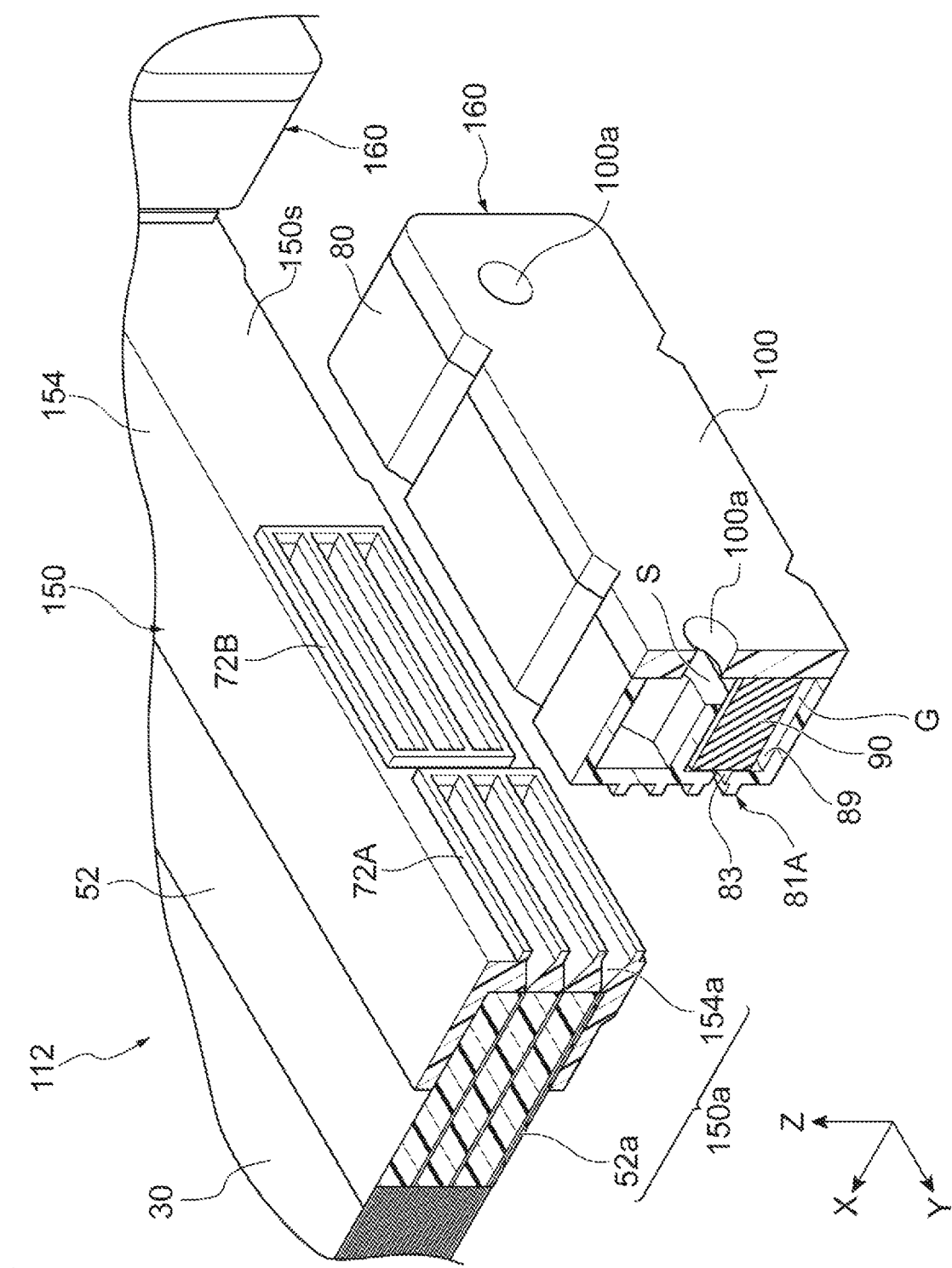
FIG. 14 is an exploded perspective view (including a partial cross-section) showing a part of an electricity storage module according to another embodiment.

FIG. 14 is an exploded perspective view (including a partial cross-section) showing a part of an electricity storage module according to another embodiment. The electricity storage module 112 shown in FIG. 14 has the same configuration as the electricity storage module 12 except that it includes a frame body 150 instead of the frame body 50 and includes a pressure regulating valve 160 instead of the pressure regulating valve 60. The pressure regulating valve 160 has the same configuration as the pressure regulating valve 60 except that it does not include the base member 70. Accordingly, the pressure regulating valve 160 has the same configuration as the above-described pressure regulating valve submodule SM. The frame body 150 has the same configuration as the frame body 50 except that it includes a second resin portion 154 instead of the second resin portion 54. The second resin portion 154 corresponds to the configuration in which the base member 70 of the pressure regulating valve 60 is integrated with the second resin portion 54. As a result, a side surface 150s of the frame body 150 extending in the laminating direction D1 corresponds to the side surface 72 of the above-described base member 70. Accordingly, the first joining protrusion portions 72A and 72B are provided on the side surface 150s of the frame body 150.

Openings 150a that are the same as the openings 50a of the frame body 50 are provided on the side surface 150s of the frame body 150. Each of the openings 150a functions as a liquid injection port for injecting the electrolytic solution into each of the internal spaces V, and functions as a connection port of the pressure regulating valve 160 after the injection of the electrolytic solution. One opening 150a includes: a plurality of (in this example, six) first openings 52a that are provided in the first resin portion 52; and a plurality of (in this example, six) second openings 154a that are provided in the second resin portion 154. The second openings 154a corresponds to the first communication holes 73 to 78 of the above-described base member 70, respectively. Each of the second openings 154a has a tapered shape in which the width of the second opening 154a in the laminating direction D1 increases toward the open end (the tips of the first joining protrusion portion 72A and 72B).

With the electricity storage module 112, the same effects as those of the electricity storage module 12 are obtained. Further, the electricity storage module 112 does not include the base member 170 and thus has a simpler structure than the electricity storage module 12. When the electricity storage module 112 is manufactured, the base member connecting step is not necessary.

REFERENCE SIGNS LIST

12: electricity storage module, 30: laminate, 30a: side surface, 32: bipolar electrode, 34: electrode plate, 34a: edge portion, 36: positive electrode, 38: negative electrode, 50, 150: frame body, 50a, 50a1, 50a2, 50a3, 50a4, 150a: opening, 50s, 150s: side surface, 52: first resin portion, 52a: first opening, 54, 154: second resin portion, 54a, 154a: second opening, 60, 160: pressure regulating valve, 70: base member (first member), 72: side surface (first side surface), 72A, 72B: first joining protrusion portion, 72C: first measurement protrusion portion, 73 to 78: first communication hole, 80: case member (second member), 81: side surface (second side surface), 81A, 81B: second joining protrusion portion, 81C: second measurement protrusion portion, 83 to 88: second communication hole, 83a to 88a: open end (first open end), 83b to 88b: open end (second open end), 89: cylindrical portion, 90: valve (elastic member), 100: cover member (third member), 100a: exhaust port, 101: lower end, 102: center, A: axis, D1: laminating direction, D2: connection direction, S: accommodation space, S1: space portion, V, V1 to V24: internal space

The invention claimed is:

1. An electricity storage module comprising:
   a laminate including a plurality of bipolar electrodes that are laminated in a laminating direction, each of the bipolar electrodes including an electrode plate, a positive electrode provided on a first surface of the electrode plate, and a negative electrode provided on a second surface of the electrode plate;
   a frame body holding an edge portion of the electrode plate and including an opening that communicates with a plurality of internal spaces provided in the laminate; and
   a pressure regulating valve connected to the opening of the frame body, wherein the pressure regulating valve is welded to the frame body,
   wherein each of the internal spaces is provided between the bipolar electrodes adjacent to each other in the laminate,
   each of the internal spaces accommodates an electrolytic solution,
   an exhaust port and a communication space are provided in the pressure regulating valve, the exhaust port being provided for exhausting gas to an external space, the gas flowing into the pressure regulating valve through at least one of the internal spaces, the communication space communicating with the exhaust port,
   a valve is provided in the communication space configured to switch between closing and opening of the pressure regulating valve, and
   the communication space includes a space portion positioned below a lower end of the exhaust port in the laminating direction.

2. The electricity storage module according to claim 1, wherein a volume of the space portion is higher than or equal to a volume of the electrolytic solution accommodated in one of the internal spaces.

3. The electricity storage module according to claim 1, wherein the lower end of the exhaust port is positioned above a center of the pressure regulating valve in the laminating direction.

4. The electricity storage module according to claim 1, wherein a plurality of exhaust ports for exhausting the gas to the external space are provided in the pressure regulating valve,
   the communication space communicates with the exhaust ports, and
   the communication space includes the space portion positioned below a lower end that is positioned on a lowermost side among lower ends of the exhaust ports.

* * * * *